(12) United States Patent
Angstmann et al.

(10) Patent No.: US 11,821,290 B2
(45) Date of Patent: Nov. 21, 2023

(54) REMOTE UNDERWATER ROBOTIC ACTUATOR

(71) Applicant: Kinetic Pressure Control Limited, Houston, TX (US)

(72) Inventors: Steven Angstmann, Houston, TX (US); Bobby Gallagher, Houston, TX (US)

(73) Assignee: Kinetic Pressure Control Ltd., Houston, TX (US)

( * ) Notice: Subject to any disclaimer, the term of this patent is extended or adjusted under 35 U.S.C. 154(b) by 126 days.

(21) Appl. No.: 17/483,235

(22) Filed: Sep. 23, 2021

(65) Prior Publication Data

US 2022/0010658 A1 Jan. 13, 2022

Related U.S. Application Data

(63) Continuation-in-part of application No. 17/427,638, filed as application No. PCT/US2020/046656 on Aug. 17, 2020.

(60) Provisional application No. 63/083,068, provisional application No. 62/888,910, filed on Aug. 19, 2019.

(51) Int. Cl.
| E21B 41/04 | (2006.01) |
| B25J 5/02 | (2006.01) |
| E21B 33/06 | (2006.01) |
| E21B 33/064 | (2006.01) |
| E21B 33/038 | (2006.01) |

(52) U.S. Cl.
CPC .............. *E21B 41/04* (2013.01); *B25J 5/02* (2013.01); *E21B 33/038* (2013.01); *E21B 33/061* (2013.01); *E21B 33/064* (2013.01)

(58) Field of Classification Search
CPC ...... E21B 41/04; E21B 33/038; E21B 33/061; E21B 33/064; B25J 5/02

USPC .......................................................... 166/338
See application file for complete search history.

(56) References Cited

U.S. PATENT DOCUMENTS

| 6,928,947 | B1 | 8/2005 | Clapham |
| 9,234,400 | B2 | 1/2016 | Warnock, Jr. et al. |
| 9,494,007 | B2 | 11/2016 | Bourgeau et al. |
| 9,822,600 | B2 | 11/2017 | Bourgeau et al. |
| 10,316,605 | B2 | 6/2019 | Bourgeau et al. |
| 10,465,465 | B2 | 11/2019 | Leach et al. |
| 10,941,648 | B2 | 3/2021 | Leach et al. |

(Continued)

FOREIGN PATENT DOCUMENTS

| GB | 1337832 A | | 11/1973 |
| KR | 20140013209 A | * | 7/2012 |
| WO | 198302798 A1 | | 8/1983 |

OTHER PUBLICATIONS

International Search Report and Written Opinion, International Application No. PCT/US2020/046656 dated Nov. 6, 2020.

*Primary Examiner* — Matthew R Buck
*Assistant Examiner* — Patrick F Lambe
(74) *Attorney, Agent, or Firm* — Victor H. Segura

(57) ABSTRACT

An underwater robotic system includes a frame for deployment in a body of water and having a control panel with multiple controls. A first actuator on the frame selectively actuates a control from a front side of the panel. A second actuator on the frame selectively actuates a control from a back side of the panel. One or more controls on the panel is configured to regulate distribution of a fluid. The frame is configured to couple to a blowout preventer. A method for robotic fluid distribution in an underwater environment.

39 Claims, 18 Drawing Sheets

(56) References Cited

U.S. PATENT DOCUMENTS

| | | |
|---|---|---|
| 11,060,372 B2 | 7/2021 | Bourgeau et al. |
| 2005/0163573 A1 | 7/2005 | McMillan |
| 2016/0176486 A1 | 6/2016 | Korneliussen et al. |
| 2016/0264223 A1 | 9/2016 | Ferguson et al. |

* cited by examiner

REMOTE UNDERWATER ROBOTIC ACTUATOR

CROSS REFERENCE TO RELATED APPLICATIONS

Continuation-in-Part of U.S. patent application Ser. No. 17/427,638 filed Jul. 31, 2021, which is a Continuation of International Application No. PCT/US2020/046656 filed Aug. 17, 2020, which claims priority from U.S. Provisional Application No 62/888,910 filed on Aug. 19, 2019. This present application also claims priority from U.S. Provisional Application No. 63/083,068 filed on Sep. 24, 2020. All the foregoing applications are incorporated herein by reference in their entirety.

BACKGROUND

This disclosure relates to the field of robotic devices. More specifically, the disclosure relates to robotic systems used to provide regulated fluid distribution to operate apparatus deployed in a body of water.

Remotely operated vehicles (ROVs) have been used in many fields ranging from underwater to interstellar applications. In the oil and gas industry, ROVs are routinely used to inspect and operate tools and equipment disposed in subsea environments. The ROVs are typically brought to the offshore site on a ship equipped with a crane to deploy the unit and equipment to control the vehicle via a tethered wire system. FIG. 1 depicts a conventional ROV 10 suspended from a ship's 12 crane in a deployment to inspect a blowout preventer (BOP) 14 at the sea floor.

BOPs for oil and gas wells are used to prevent potentially catastrophic events known as blowouts, where high well pressures and uncontrolled fluid flow from a subsurface formation into the well can expel tubing (e.g., drill pipe and well casing), tools and drilling fluid out of the well. Blowouts present a serious safety hazard to drilling crews, the drilling rig, and the environment, and can be extremely costly. Typically, BOPs have "rams" that are opened and closed by actuators. The most common type of actuator is operated hydraulically to push closure elements across a through bore in a BOP housing to close the well. In some cases, the rams have shears to cut through a drill string or other tool which may be in the well, and consequently in the through bore, at the time it is necessary to close the BOP. Conventional BOP systems utilize pressurized hydraulic fluid containers known as accumulators to energize and actuate the rams.

It is known in the art to install emergency activation panels on subsea BOP stacks. These emergency activation panels may comprise valves and stab connectors for hydraulic fluid designed to be operated by ROVs such that the BOP stack can be operated in the event of primary (surface deployed) control failure. ROVs are expensive and require skilled operators to navigate and control the units while deployed. Conventional ROVs also typically have a high-power demand, requiring heavy umbilical conductors to provide the power needed to run propulsion thrusters, lights, manipulating arms, controllers, etc.

There is a need for improved techniques to perform unmanned remote functions, particularly in subsea environments. A need also remains for improved well pressure control techniques, and particularly for improved fluid control systems so used.

SUMMARY

One aspect of the present disclosure is a robotic system for fluid distribution. The frame is configured for disposal in a body of water. A control panel is disposed proximate the frame and has a plurality of controls thereon. A first actuator is disposed on the frame to selectively actuate a control of the plurality of controls on the control panel from a front side of the panel. A second actuator is disposed on the frame to selectively actuate a control of the plurality of controls on the control panel from a back side of the panel. One or more controls of the plurality of controls is configured to regulate distribution of a fluid.

In another aspect, a robotic system for fluid distribution includes a frame configured for disposal in a body of water coupled to a blowout preventer. A control panel is disposed proximate the frame and has a plurality of controls thereon. A first actuator is disposed on the frame to selectively actuate a control of the plurality of controls on the control panel from a front side of the panel. A second actuator is disposed on the frame to selectively actuate a control of the plurality of controls on the control panel from a back side of the panel. The system includes a fluid reservoir. One or more controls of the plurality of controls is configured to regulate distribution of fluid in the system. Means are included for moving fluid from the fluid reservoir into an actuator on the blowout preventer.

In some aspects, a method for robotic fluid distribution in an underwater environment includes disposing a frame in a body of water, the frame having a control panel with a plurality of controls thereon. Distribution of a fluid is regulated by activating a first actuator disposed on the frame to selectively actuate a control of the plurality of controls on the control panel from a front side of the panel, or by activating a second actuator disposed on the frame to selectively actuate a control of the plurality of controls on the control panel from a back side of the panel.

Some aspects include an underwater robotic system including a frame adapted for deployment in a body of water. The frame has guide rails and at least one movable rail movably coupled to the guide rails. An actuator module is movably coupled to the at least one movable rail. A control panel disposed proximate the frame and has a plurality of controls thereon. The plurality of controls is operable by an actuator on the actuator module. A position of each of the plurality of controls is known such that motion of the actuator module and the at least one movable rail is remotely controllable to actuate any chosen one of the plurality of controls.

Some aspects further comprise a controller in signal communication with a first linear actuator for moving the movable rail and a second linear actuator for moving the actuator module, the controller comprising instructions thereon to operate the first linear actuator and the second linear actuator to position the actuator module proximate the chosen one of the plurality of controls.

Some aspects further comprise at least one sensor in signal communication with the controller, the controller comprising instructions thereon to operate the first and second linear actuator to automatically move the actuator module to a chosen control in response to measurements made by the at least one sensor.

In some aspects, the controller comprises instructions to move the actuator module to chosen ones of the plurality of controls in a predetermined sequence. Some aspects further comprise a signal communication channel in signal communication with the controller. The signal communication channel may be in signal communication with a control system remote from the robotic system.

In some aspects, the signal communication channel comprises an electrical or optical cable. In some aspects, the signal communication channel comprises an acoustic transceiver. In some aspects, the actuator is extendable and retractable with respect to the actuator module. In some aspects, the actuator is operable to rotate to cause operation of the chosen one of the plurality of controls.

Some aspects further comprise a battery disposed proximate the frame and in electric power connection with a first linear actuator for moving the movable rail and a second linear actuator for moving the actuator module. Some aspects further comprise a battery disposed proximate the frame and configured to power at least one component on the frame. Some aspects further comprise an electrical power line extending from the battery to a source of electric power remote from the battery to charge the battery. Some aspects further comprise at least one articulated arm coupled to at least one of the frame and the actuator module, the articulated arm comprising jointed sections arranged to enable motion of an end of the articulated arm to a selected position with respect to the frame. Some aspects further comprise a manipulation device coupled to the end of the articulated arm. In some aspects, the frame is configured to couple to a blowout preventer. Some aspects further comprise a hydraulic pump configured to power at least one linear actuator.

In some aspects, a method for remotely operating a control includes deploying a frame in a body of water. The frame has guide rails. The method includes moving a first actuator to a first chosen position within a plane defined by the guide rails. The first chosen position corresponds to a known position of the control on a panel comprising a plurality of controls each at a corresponding known position on the panel. The first actuator is caused to operate the control.

Some aspects further comprise repeating the moving the first actuator to at least a second chosen position and causing the first actuator to operate one of the plurality of controls associated with the at least a second position. The moving to the first and at least a second position are performed automatically such that operation of the control associated with the first and at least a second position are performed in a predetermined sequence. In some aspects, the moving to the first and at least a second position are performed automatically such that operation of the control associated with the first and at least a second position are performed automatically.

In some aspects, the moving to the first and at least a second position are performed automatically such that operation of the control associated with the first and at least a second position are performed by communicating a control signal from a remote location along a signal communication channel. In some aspects, the signal communication channel comprises an electrical or optical cable.

In some aspects, the signal communication channel comprises an acoustic transceiver. In some aspects, the causing the first actuator to operate the control comprises extending the first actuator from an actuator module. In some aspects, the causing the first actuator to operate the control comprises rotating the first actuator. In some aspects, substantially all power to perform the moving and causing the first actuator to operate is provided by a battery. In some aspects, the battery is charged over an electrical power cable linked to a source remote from the battery. In some aspects, the chosen position and associated control are automatically chosen in response to measurements made by at least one sensor. In some aspects, the frame is coupled to a blowout preventer disposed in the body of water. Other aspects and possible advantages will be apparent from the description and claims that follow.

DETAILED DESCRIPTION

Figure 1:
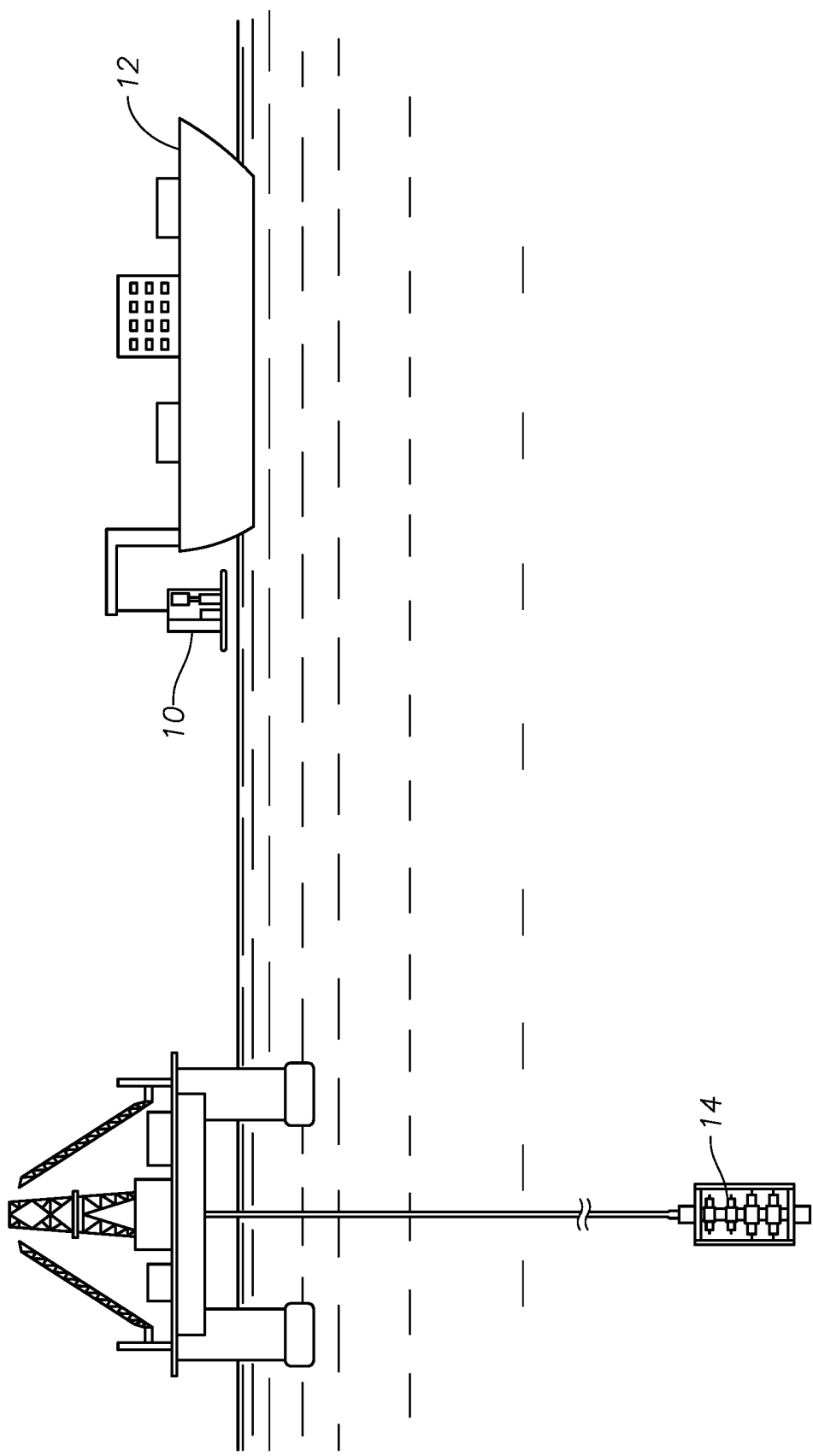
FIG. 1 shows an example deployment of a remotely operated vehicle (ROV) known in the art using a ship's crane to lower the ROV into a body of water.

Illustrative embodiments are set forth in this disclosure. In the interest of clarity, not all features of any actual implementation are described. In the development of any such actual implementation, some implementation-specific features may need to be provided to obtain certain design-specific objectives, which may vary from one implementation to another. It will be appreciated that development of such an actual implementation, while possibly complex and time-consuming, would nevertheless be a routine undertaking for persons of ordinary skill in the art having the benefit of this disclosure. The disclosed embodiments are not to be limited to the precise arrangements and configurations shown in the figures and as described herein, in which like reference numerals may identify like elements. Also, the figures are not necessarily drawn to scale, and certain features may be shown exaggerated in scale or in generalized or schematic form, in the interest of clarity and conciseness.

Figure 2:
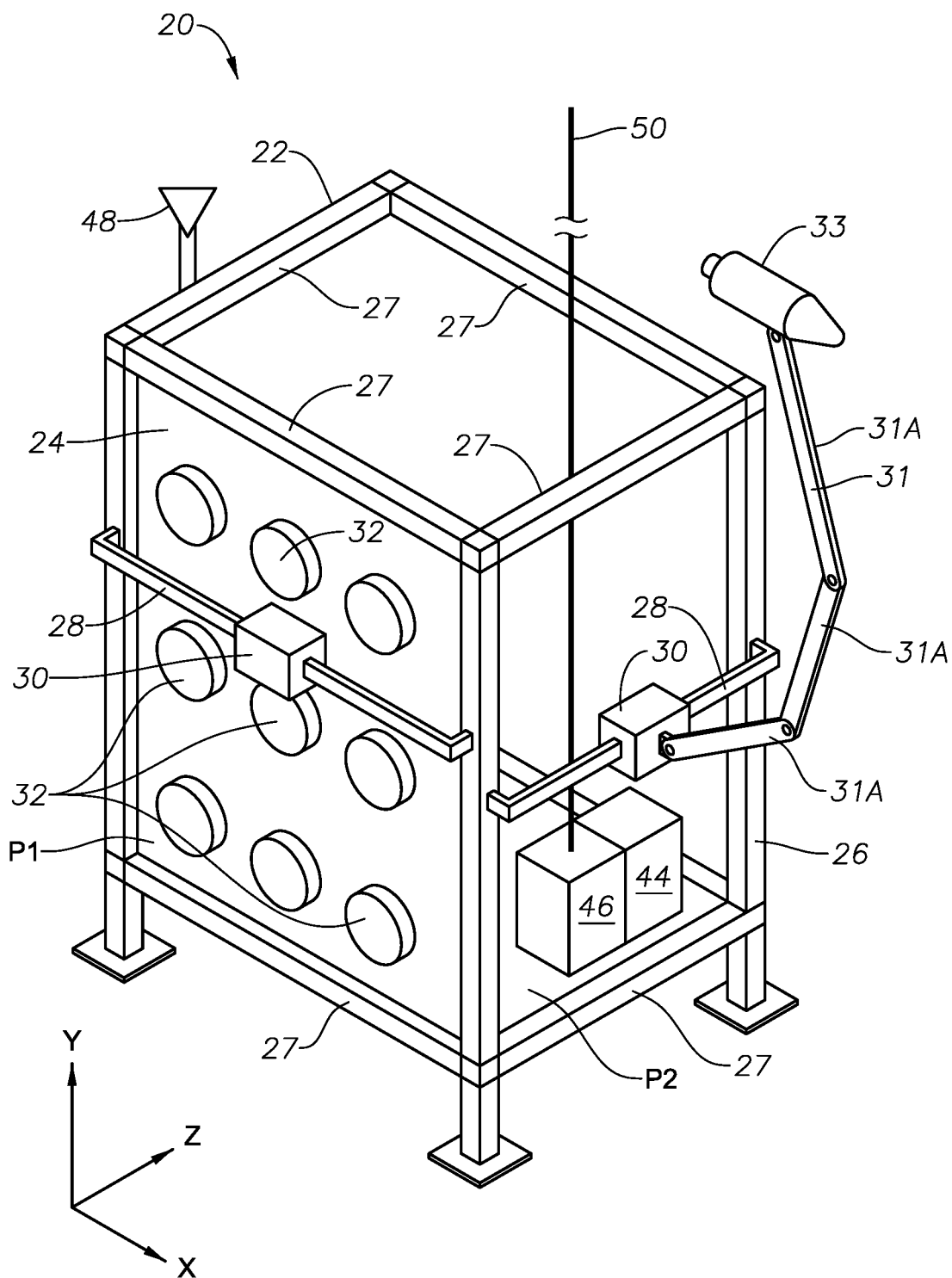
FIG. 2 shows an example embodiment of a robotic system according to this disclosure.

Embodiments set forth in this disclosure present robotic systems configured for remote deployment and operation, in some embodiments, for deployment in a body of water. Such deployment may be used, for example, to operate equipment disposed in the water, such as on the sea floor. FIG. 2 shows an embodiment of a robotic system 20. The robotic system 20 comprises a frame structure 22 including an associated control panel 24 and interconnected guide rails 26. The frame structure may be configured to be deployed in a body of water, for example, to operate on the sea bottom to service or operate equipment associated with a subsea petroleum well. The frame structure 22 may be designed in any suitable configuration or geometric arrangement. In some embodiments, at least one surface or face of the frame structure 22 may be configured with guide rails 26 linked together in a planar configuration, i.e., that define a plane, to provide a platform for two-dimensional linear (e.g., vertical, and horizontal) movement within the plane defined by the guide rails 26. The guide rails 26 may be linked by cross-braces 27. One such plane P1 is shown in FIG. 2 as extending in the x, y directions, where coordinate directions are indicated by the legend, x, y, z in FIG. 2. Other planes, e.g., P2, may be defined by other such guide rails 26 forming part of the frame structure 22.

The frame structure 22 may include one or more movable rails 28 movably disposed between corresponding guide rails 26 as shown in FIG. 2. The guide rails 26 and movable rails 28 may have any suitable cross-sectional shape, e.g., may be round (i.e., rod-shaped) or square cross-section. The movable rails 28 can move up or down along the guide rails 26 independently of one another. In FIG. 2, one of the movable rails can move within plane P1. Another one of the movable rails 28 may move within another plane P2 defined by guide rails 26 and corresponding cross-braces 27. In some embodiments, such as the one shown in FIG. 2, the frame structure 22 may be implemented with one or more vertically movable rails 28 configured to move vertically along the plane(s) P1, P2 defined by the guide rails 26. Each movable rail 28 may include thereon an actuator module 30 configured to move back and forth along the length of the respective movable rail 28 (e.g., horizontally, from side-to-side in the embodiment of FIG. 2). The robotic system 20 may also comprise an articulated arm 31 coupled at one end to one or more of the actuator modules 30. The articulated arm 31 may be configured with a manipulation device 33 at the other end. The articulated arm 31 may be configured with jointed and/or telescoping sections 31A that allow the articulated arm 31 to move and rotate to various directions and positions. Conventional articulated arms 31 as used in ROVs may be used to implement the embodiments of this disclosure. The manipulation device 33 may be configured to perform any function or combination of functions as known in the art for example and without limitation, a gripper, light, camera, probe, sensor, fastener tool, cutter, torch, etc.

The movable rails 28 may be moved along the respective guide rails 26 by a linear actuator (not shown separately) which may comprise any suitable device known in the art for linear motion, including, without limitation, a linear electric motor, hydraulic cylinder and ram, gear and rack combination, worm gear and ball nut combination and sheave and cable system. A corresponding linear actuator (not shown) may be provided to move each actuator module 30 along its respective movable rail. In combination, the linear actuator for the movable rail 28 and corresponding linear actuator for the actuator module 30 enables each actuator module 30 to be positioned at any chosen location within its respective plane P1, P2.

Figure 3:
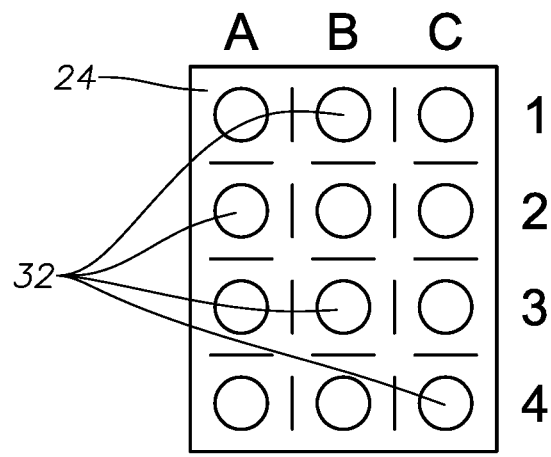
FIG. 3 shows an example embodiment of a control panel arrangement according to this disclosure.

The control panel 24 may include a plurality of controls 32, such as knobs or switches. The controls 32 may be arranged on the control panel 24 in an ordered grid pattern. FIG. 3 depicts an example control panel 24 face with the controls 32 arranged in an ordered grid pattern identified as columns A-C and rows 1-3. Behind the control panel 24, the controls 32 may be configured with conduits, cables, and wiring of types known in the art used for coupling to the objects to be controlled or activated via the controls. Some embodiments may be implemented with the control panel(s) 24 equipped with controls 32 comprising conventional electric toggle-type switches. Some embodiments may be implemented with controls 32 and actuator modules 30 providing other types of activation/trigger modes as known in the art (e.g., LED, infrared sensors, etc.). The positions of the various controls 32 in any embodiment of the control panel 24 need not be regularly spaced; in some embodiments, the positions of each of the controls 32 are known or determinable within the respective plane (e.g., P1 in FIG. 2).

Figure 4:
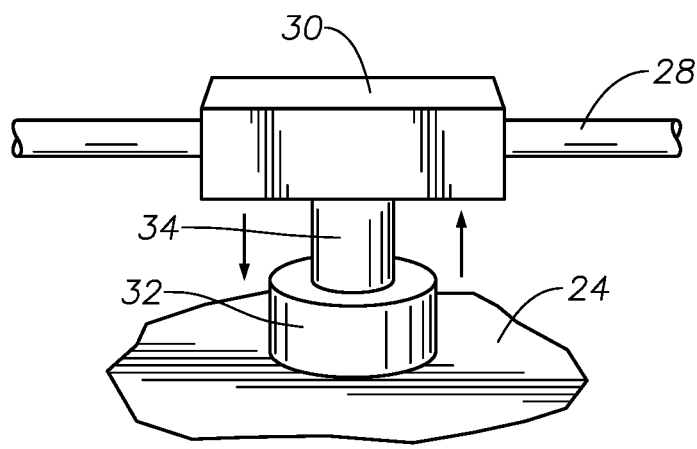
FIG. 4 shows an example embodiment of an actuator module that may be used with the embodiment shown in FIG. 2.

FIG. 4 depicts a side view of an example embodiment of an actuator module 30. The actuator module 30 may be configured with an extendable and retractable pin 34. The control panel 24 is mounted on the frame 22 at a predetermined distance from the actuator module 30 to allow the pin 34 to contact the controls (e.g., knobs or switches) 32 when the pin 34 is extended from the actuator module 30. With this configuration, if it desired to operate the control 32 in a chosen control panel grid position (e.g., B-2 in FIG. 3), the movable rail 28 and actuation module 30 respectively move vertically and horizontally to position the pin 34 directly over the control 32 (in the B-2 position in this example). Once in position, the pin 34 is extended from the actuator module 30 to depress and/or toggle the chosen control 32. The pin 34 is then retracted into the actuator module 30, ready for another control operation. The pin 34 may be extended and retracted using any suitable mechanism, including without limitation, a solenoid, hydraulic cylinder, spring (and magnet/coil to retract) and screw drive/nut. In some embodiments, the pin 34 may comprise one or more geometric features (not shown) to engage corresponding feature(s) on the control 32, for example, splines, to enable operation of the control 32 by rotating the pin 34 as will be further explained with reference to FIGS. 5A and 5B.

Figures 5A, 5B:
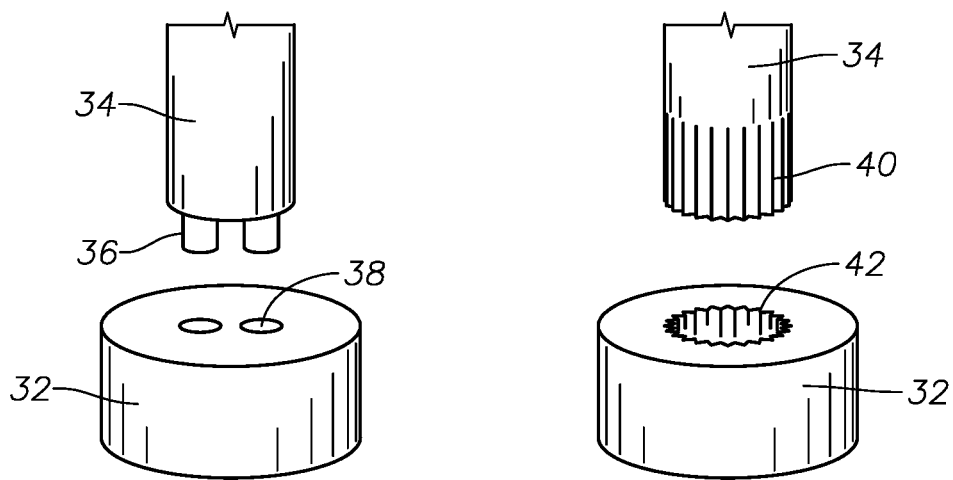
FIGS. 5A and 5B show example embodiments of an actuator used to operate a control on a control panel such as shown in FIG. 2.

In some implementations, the controls 32 are configured to rotate to make graduated adjustments (e.g., to make pressure or level adjustments). Some embodiments of the actuator module 30 may therefore be configured with pins 34 that extract, retract, and rotate in either direction in a controlled manner as explained above. Pin 30 embodiments may be configured with the pin end having a specific shape or pattern to engage with the corresponding shape or pattern formed on the control 32 on the control panel 24. FIG. 5A depicts such an embodiment, with an actuator (e.g., a pin) 34 having a pair of protrusions 36 extending from the pin end to engage with corresponding holes 38 formed on the control 32 surface. FIG. 5B depicts an actuator (pin) 34 having a splined end 40 to engage with a corresponding splined opening 42 formed in the control 32 surface. These example configurations enable positive engagement of the pin 34 with and controlled rotation of the control(s) 32. It will be appreciated that any pin-control embodiments may be configured with other matching patterns, protrusions, or shapes as desired.

The movable rails 28 and actuator modules 30 may be implemented using conventional components and hardware as known in the art. For example, conventional computer numerical control (CNC) framing structures, controllers, electronics, and components may be used to implement some embodiments according to this disclosure. Commercially available components designed for underwater applications may be used to implement the disclosed embodiments. In some implementations, custom designed waterproofing may be required, e.g., for certain water depths, which can be performed using any suitable techniques as known in the art. For example, conventional linear motion bearings can be configured with seals to resist water invasion for underwater applications. Robotic system 20 components may also be formed of non-metallic materials such as plastics, composites, or synthetic materials.

Referring once again to FIG. 2, some embodiments may include a power supply 44, a controller 46, and an acoustic transceiver 48 (e.g., in signal communication with the controller 46). The controller 46 may comprise any suitable microcomputer, field programmable gate array, microprocessor or any similar device and may be programmed to activate and run certain components on the robotic system 20 as desired according to the application of the robotic system 20. The power supply 44 may be implemented, for example, using conventional batteries configured for underwater use as known in the art. In some embodiments, a power/communication line 50 may be coupled to the controller 46 or another component on the system to provide a hardwired power and/or data transfer and communication link to the robotic system 20. In some embodiments, the power/communication line 50 may have current carrying capacity only sufficient to recharge the batteries in the power supply 44 while the robotic system 20 is idle, wherein the power supply 44 itself provides sufficient power to operate the robotic system 20 (e.g., the controls, acoustic transceiver, etc.) in its intended use. In such way, providing a high current capacity power line to surface may be avoided. The power/communication line 50 may, for underwater operations, extend to the surface (e.g., to provide direct real time control/data transfer functionality) or to another module on the robotic system 20, or to another tool or device in the vicinity of the system (e.g., another remote robotic system), depending on the desired application. Communication and data signal transfer can also be carried out via the acoustic transceiver 48 as known on the art. In some implementations where direct operator control is desired (e.g., to make selective adjustments or activations using the articulated arm 31) an operator on a ship at the water surface or elsewhere can communicate and direct the robotic system 20 by communicating suitable control signals, along the power/communication line 50 and/or the acoustic transceiver 48. In some embodiments, the controller 46 can be programmed to perform autonomous activations by suitable operation of the actuation module 30 and/or the articulated arm 31.

Figure 6:
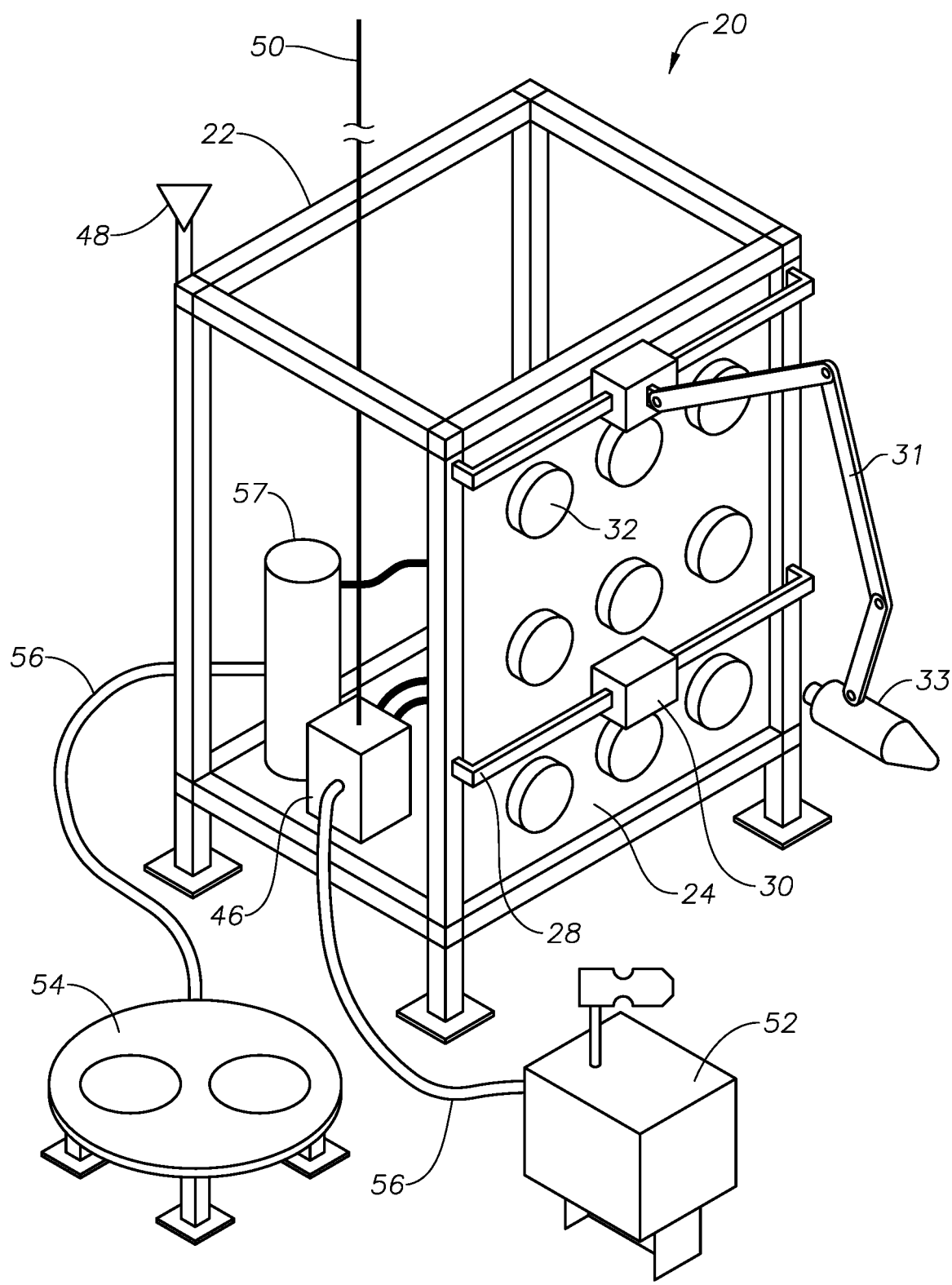
FIG. 6 shows an example embodiment of a robotic system comprising associated apparatus operable by the robotic system.

The robotic systems 20 according to this disclosure may be used as stand-alone units or may be incorporated or used with other systems, tools, or equipment to be remotely deployed. FIG. 6 shows a system positioned on the sea floor and linked to sensors 52 and other equipment 54 via conduits (cables or hoses) 56. The controls 32 on the control panel 24 in the present embodiment are linked to the sensors 52 and other equipment 54 to activate and control features and functions on the sensors 52 and equipment 54 as desired. The robotic system 20 may be anchored at the sea floor using techniques as known in the art. In some embodiments, the power supply 44 or the power/communication line 50 may be configured to power a hydraulic pump 57 disposed on the unit, which in turn may be configured to power the linear actuators or other components.

Figure 7:
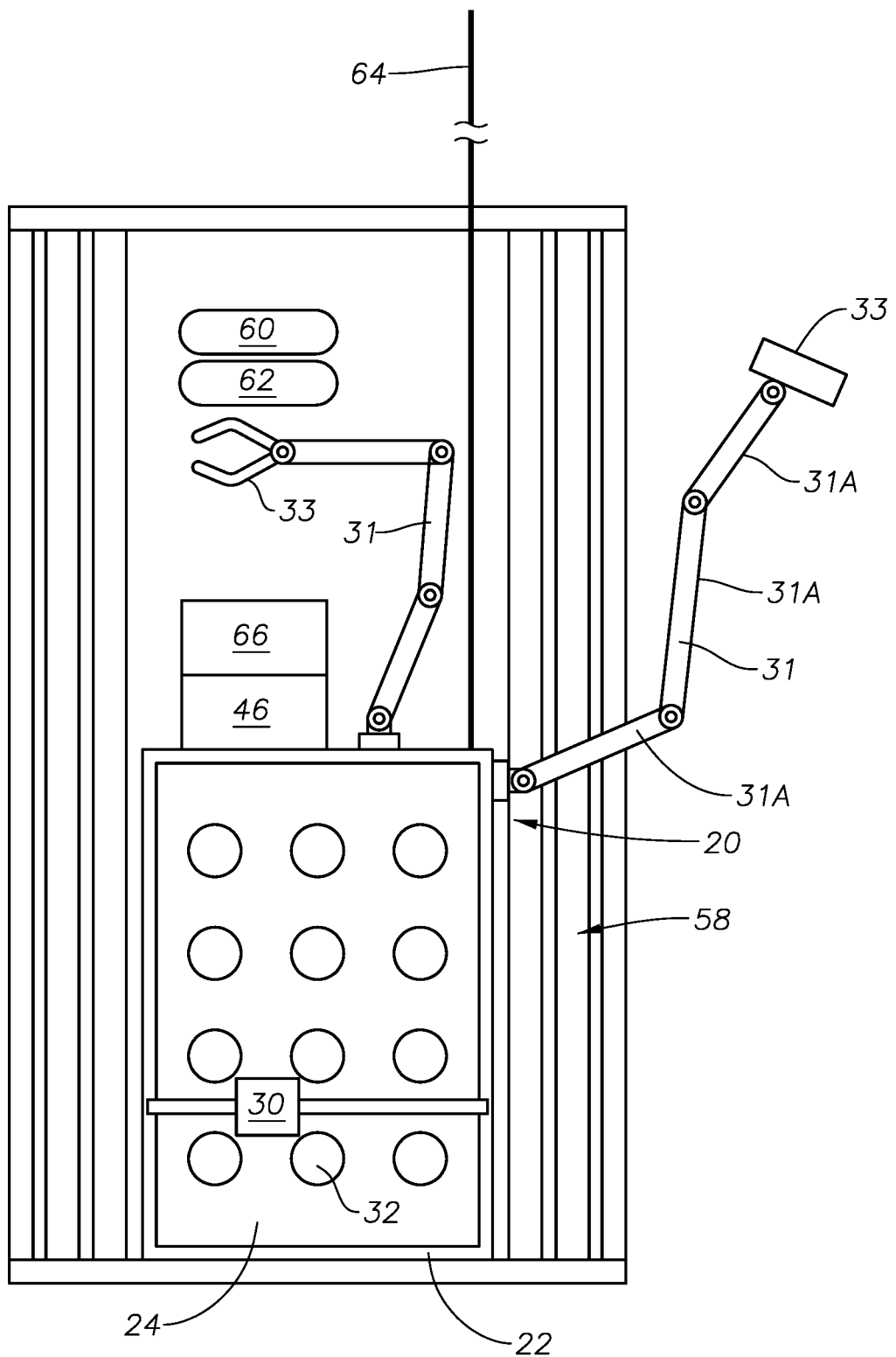
FIG. 7 shows an example embodiment of a robotic system attached to a blowout preventer according to this disclosure.

FIG. 7 depicts a robotic system 20 integrated with a BOP assembly 58 at the sea floor. In some embodiments, the frame structure 22 may be secured to the BOP assembly 58 such that the BOP assembly 58 may be deployed (e.g., attached to a subsea wellhead) with the robotic system 20 coupled in place to the BOP assembly prior to deployment in the water. The robotic system 20 may include components that link with the BOP assembly's 58 hydraulic, pneumatic, and electronic systems to provide system-specific functionality. In addition to the actuator module 30 calibrated to the control panel 24, the robotic system 20 of FIG. 7 may include a pair of articulated arms 31 (as described with reference to FIG. 2) configured to perform multiple operations. The articulated arms 31 may be configured with jointed sections 31A that allow the articulated arms 31 to move and rotate to various directions and positions. The base of each articulated arm 31 is configured to move in linear motion along the rails 22.

With the robotic system 20 incorporated with the BOP 58, the control panel 24 and articulated arms 31 may be used to perform multiple functions remotely. For example, the system 20 may be used to open and close components on the BOP (e.g., valves), vent systems (e.g., accumulators), provide backup/emergency operations, perform arm-disarm functions, perform refill operations (e.g., via a hydraulic fluid reservoir 60 or compressed air tank 62 with an extendable stab). The articulated arms 31 may also be configured with cameras and lights to record unit operation and/or facilitate viewing by a remote operator. In some embodiments, the system 20 can be coupled to the BOP's 58 multiplex (MUX) cable 64 for subsea communication and data transfer to and from the surface. With such embodiments, an operator can directly and remotely control the robotic system's 20 controls 32 and articulated arms 31 as desired. In some embodiments the system 20 can also be linked to receive electrical power from the BOP's power supply 66.

Figure 8:
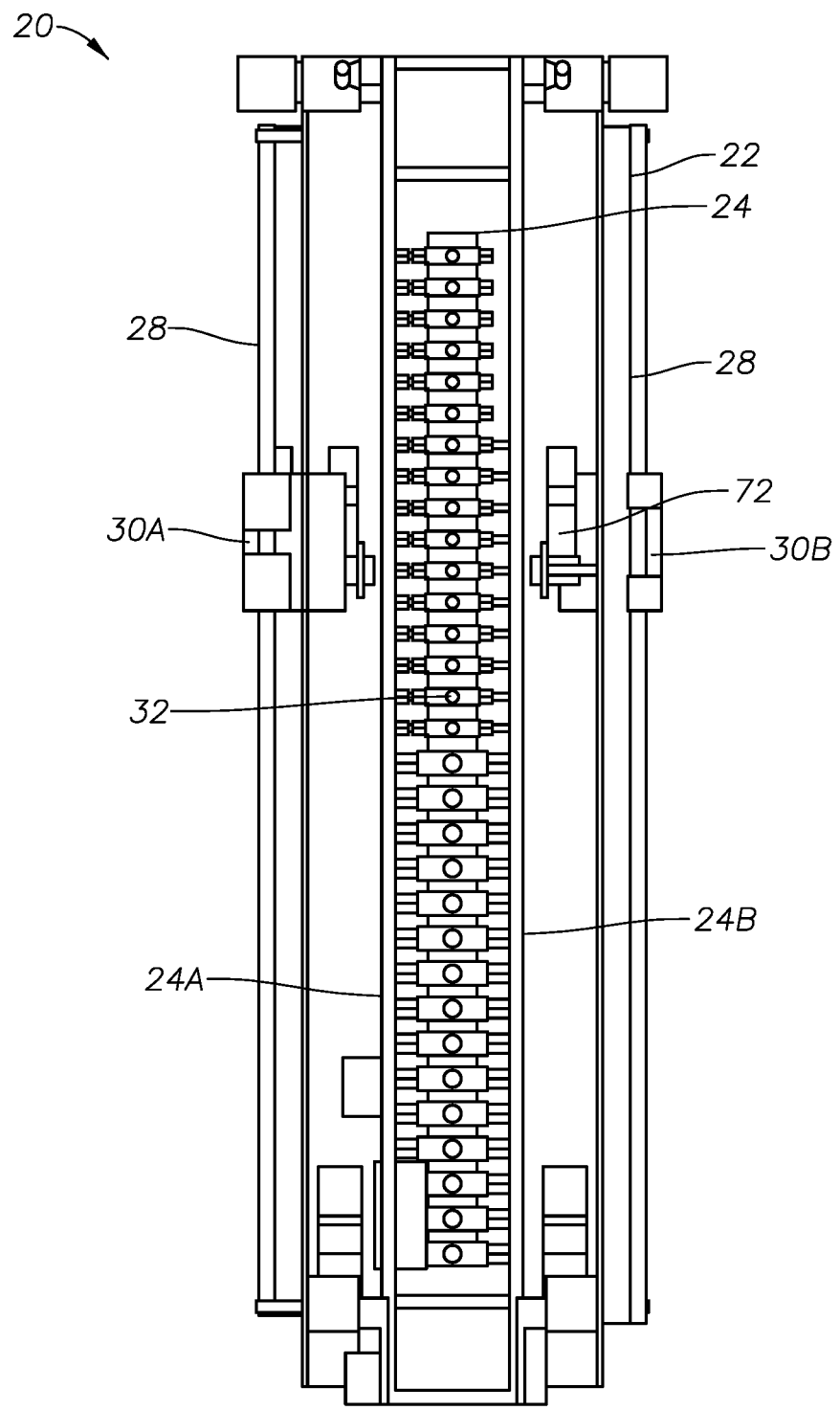
FIG. 8 shows an example embodiment of a robotic system according to this disclosure.

Turning to FIG. 8, another robotic system 20 embodiment of this disclosure is shown. The frame 22 is constructed to house or overlay a control panel 24 configured with a series of controls 32, gauges, meters, and instrumentation. The control panel 24 has a front side 24A and a back side 24B. FIG. 8 depicts a view from one end of the frame 22. This robotic system 20 is configured in a more compact design, as compared to other embodiments, as the frame 22 is generally fitted to overlay the control panel 24. A first actuator module 30A is mounted on a pair of movable rails 28 positioned on the frame 22 to allow the actuator to access and actuate any of the controls 32, gauges, meters, and instrumentation from the front side 24A of the control panel 24.

In some embodiments, the control panel 24 is equipped with controls 32 including a series of conventional double stem ball valves (e.g., subsea ball valves produced by Parker Hannifin Corp.). FIG. 8 shows a control panel 24 equipped with controls 32 including a series of double stem ball valves. The double stem ball valves provide for double-sided actuation. A second actuator module 30B is mounted on a pair of movable rails 28 positioned on the frame 22 to allow the actuator to access any of the controls 32, gauges, meters, and instrumentation from the opposite or back side 24B of the control panel 24. In this manner, the system 20 provides redundancy of control 32 actuation. If for some reason either actuator module 32A, 32B is unable to access or actuate a particular control 32, the other actuator can be activated to do so from the opposite side of the control panel 24.

Figure 9:
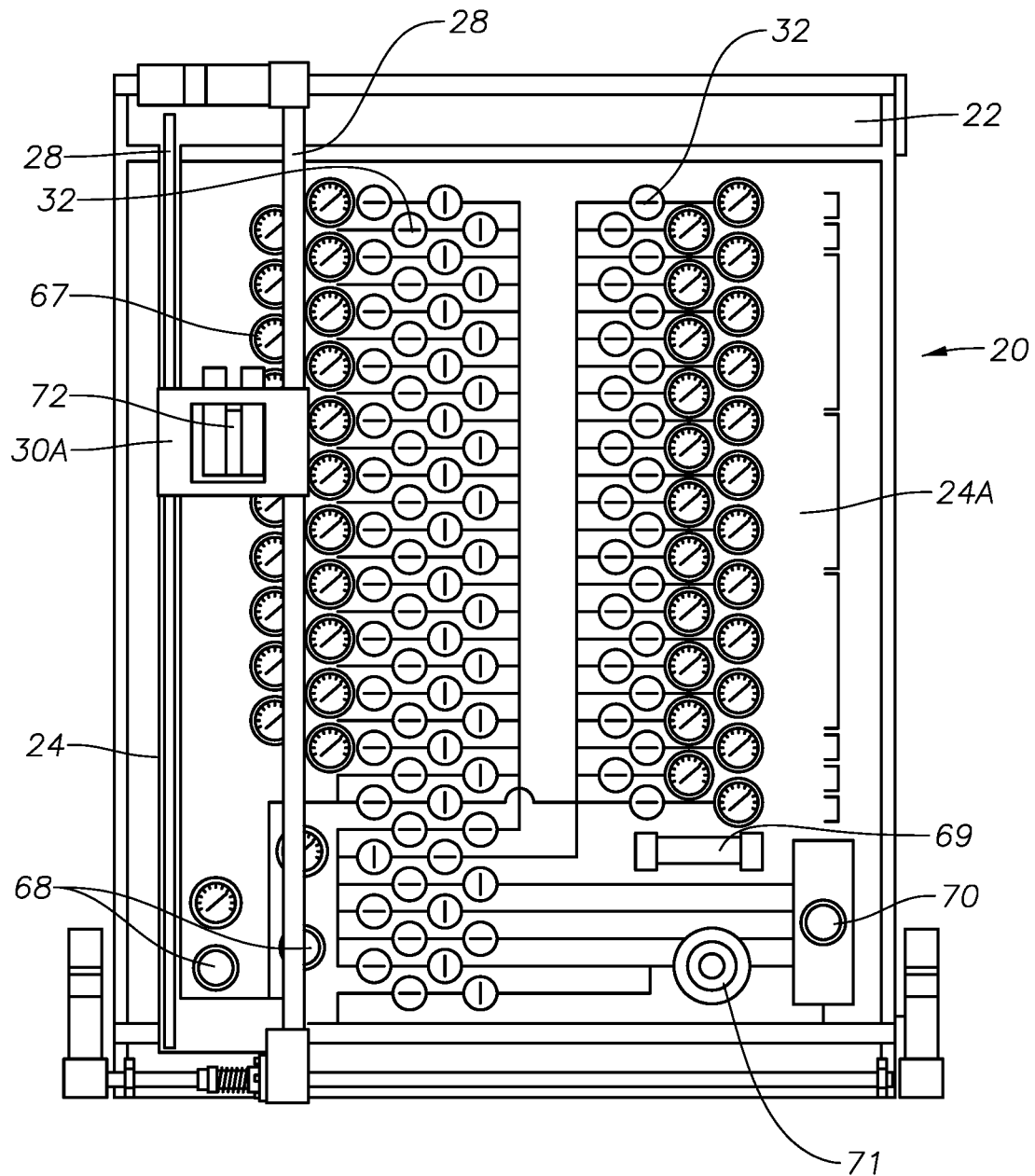
FIG. 9 shows an example embodiment of another robotic system according to this disclosure.

FIG. 9 shows another embodiment of a robotic system 20 of this disclosure. In this embodiment, the control panel 24 is equipped with controls 32 including a series of double stem ball valves mounted to form a set of rows and columns. Some embodiments may be equipped with pressure gauge indicators 67, flow gauge indicators 68, a system availability display 69, a tank level and function totalizer 70, and an ROV receptacle 71. Although only the front side 24A of the control panel 24 is shown, it will be appreciated that the controls 32, gauges, meters, and instrumentation are mirrored on the opposite or back side 24B of the panel. In actuality, the system is duplicated on the back side 24B of the panel 24. In some embodiments, the first 30A and/or second actuator 30B is equipped with a subsea camera 72 to provide a remote video capability to view/read the controls 32, gauges, displays, meters, and instrumentation from the respective front side 24A or back side 24B of the panel 24.

Figure 10:
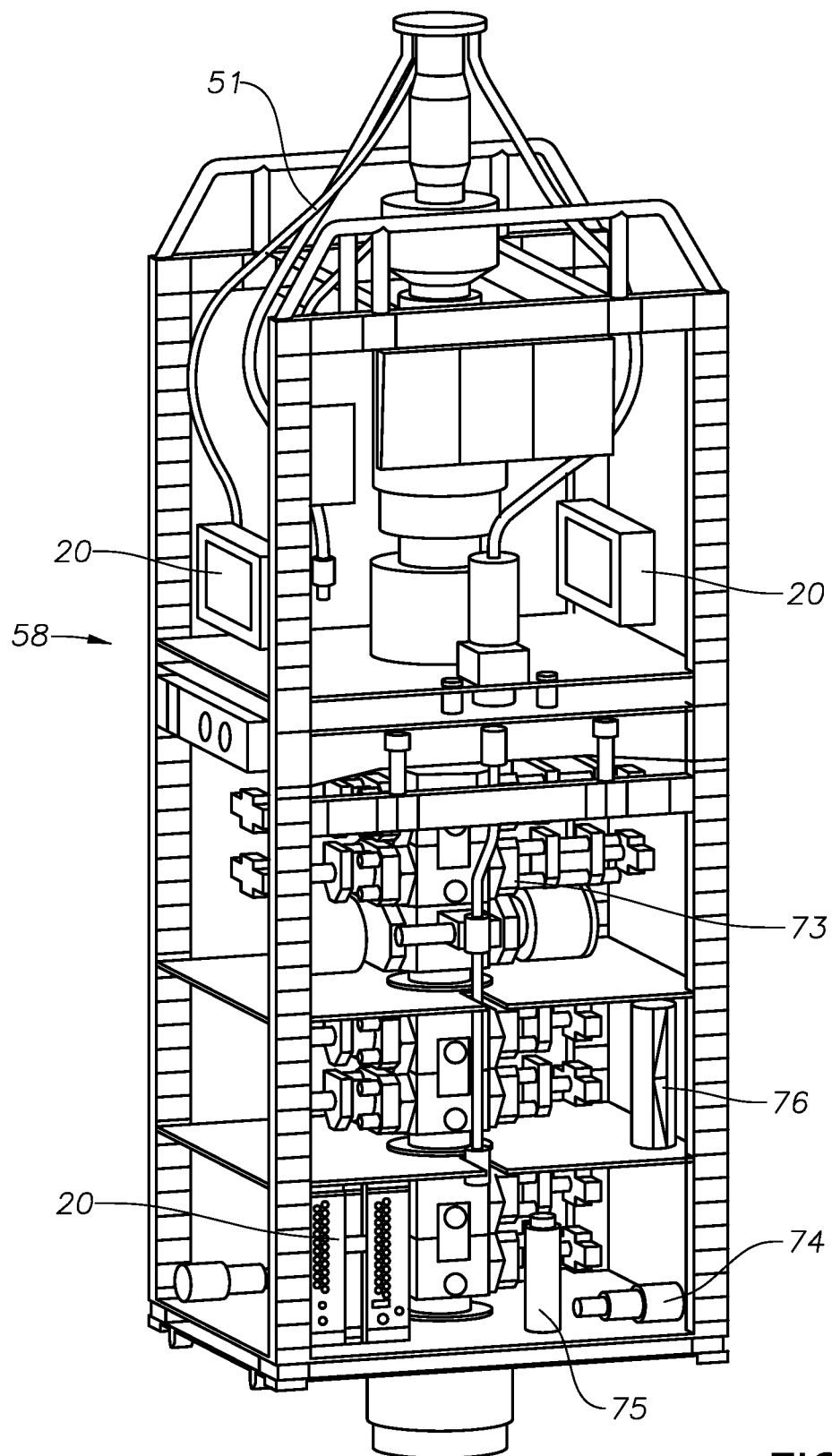
FIG. 10 shows an example embodiment of a robotic system attached to a blowout preventer according to this disclosure.

FIG. 10 shows another BOP assembly 58 integrated with robotic system 20 embodiments. In some embodiments, the frame structures 22 of the robotic systems 20 may be secured to the BOP assembly 58 such that the BOP assembly 58 may be deployed (e.g., attached to a subsea wellhead) with the robotic system 20 coupled in place to the BOP assembly prior to deployment in the water. The BOP assembly 58 includes stacked conventional BOP units 73, which as previously described, are generally configured with rams that are actuated by hydraulic fluid under pressure typically provided by accumulator tanks.

As shown in FIG. 10, embodiments of the present disclosure do not entail the use of pressurized accumulators to operate the BOP units 73. In addition to the robotic systems 20, the BOP assembly 58 is equipped with a unitary module 74 consisting of a variable displacement pump, a subsea motor, and variable frequency drive (VFD). The separate module 74 components are coupled together to provide a compact unit. The variable displacement pump in the module 74 is fluidly coupled to a hydraulic fluid reservoir 75 also mounted on the BOP assembly 58. A controller bottle 76 is also linked to the module 74 to house local electronics and processors for operational control of the system. One or more batteries may be housed in the controller bottle 76 or mounted independently as desired. One or more conduits 51 are coupled to the BOP 58 stack to provide power, data/signal communications, and/or fluid transfer. Embodiments may also be implemented with a power/communication line (e.g., FIG. 2, item 50) or a MUX cable (e.g., FIG. 7, item 64). In some embodiments, the conduits 51 may include power lines to recharge the batteries (e.g., to provide a trickle charge when the system is idle, to maintain a set charge). The power/communication line (e.g., FIG. 2, item 50) may, for underwater operations, be linked to extend to the surface to provide direct real time control/data transfer functionality and/or a power supply exclusively from the surface, depending on the desired application. In some applications, electrical power may also be supplied to the batteries and/or the system via an ROV coupling into the ROV receptacle on the robotic system(s) 20 (e.g., FIG. 9, item 71). In some embodiments, hydraulic fluid may also be provided to the reservoir 75 via an ROV. For clarity of illustration, not all conduits (e.g., hoses, cabling) are shown in FIG. 10. It will be appreciated by those skilled in the art that conventional hardware, electronics, and components may be used to implement the embodiments of this disclosure.

Figure 11:
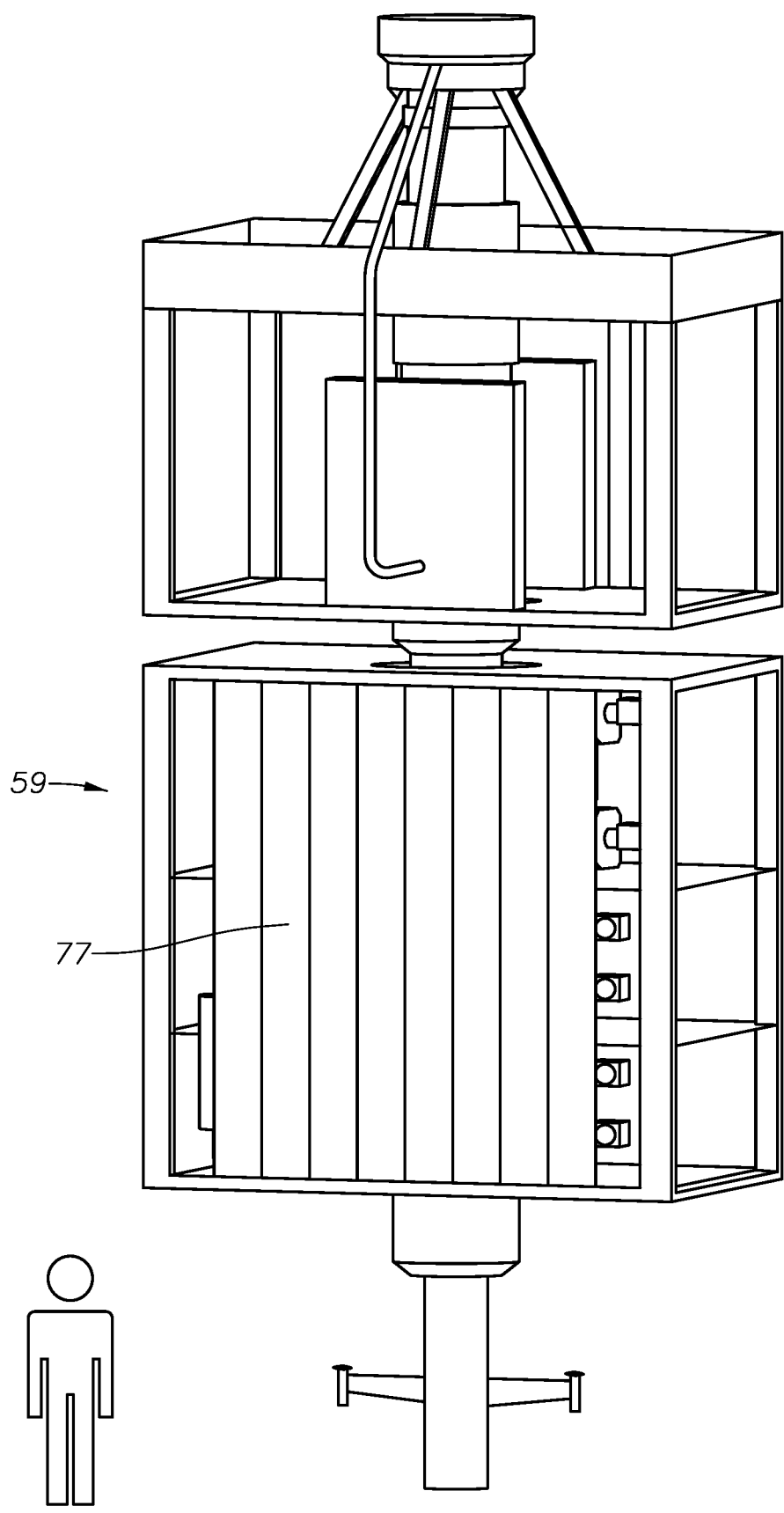
FIG. 11 shows an example blowout preventer known in the art.
Figure 12:
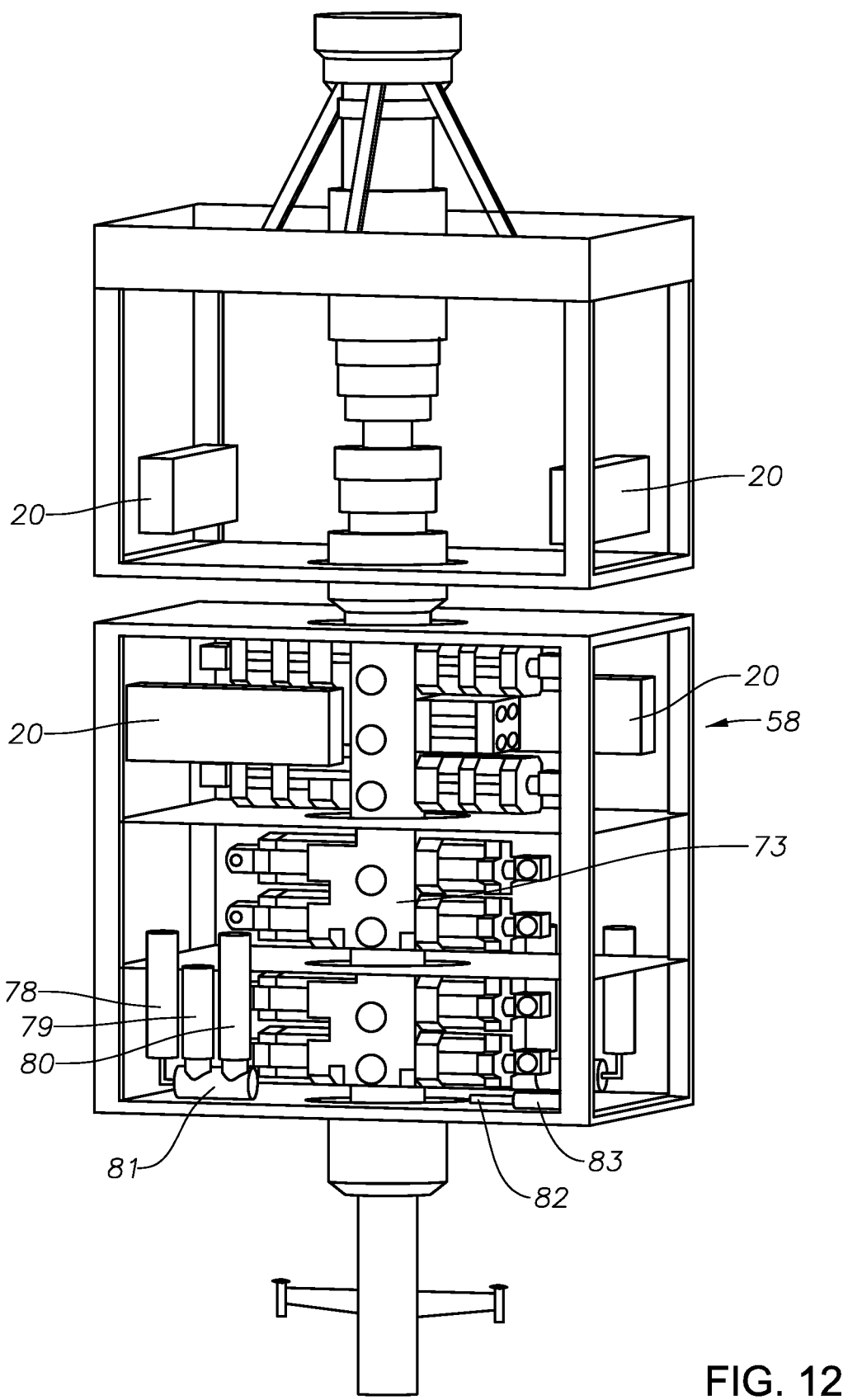
FIG. 12 shows an example embodiment of a robotic system attached to a blowout preventer according to this disclosure.

FIG. 11 shows a conventional BOP system 59. Such conventional BOP systems 59 require multiple pressurized accumulator tanks 77 to provide the energy to actuate the BOP rams. The accumulator tanks 77 are massive and take up a lot of volume, commonly adding approximately 200,000 Lb. (90718 Kg) to the overall weight of the structure. Turning to FIG. 12, an embodiment of the present disclosure is shown.

As can be seen in FIG. 12, the disclosed embodiments do not require the use of pressurized accumulators 77. Not only does this result in a significant reduction in the overall weight of the BOP assembly 58, but it also improves operational reliability and performance. Although not shown in FIG. 11, conventional systems with accumulators 77 require multiple hoses and associated valving to convey the pressurized hydraulic fluid to the BOP 59 rams. Such conventional configurations are prone to result in reduced reliability and possible failure, particularly in a subsea environment. In contrast, the disclosed embodiments efficiently utilize a combination of elements to provide superior performance compared to conventional systems.

The embodiment of FIG. 12 shows a BOP assembly 58 equipped with multiple robotic systems 20. These systems 20 may be implemented for operation as desired. For example, the upper robotic system(s) 20 may be implemented to provide functionality on the Lower Marine Riser Package, while the lower robotic system(s) 20 may be implemented to provide functionality for the BOP stack 73. This embodiment is configured with a separate battery bottle 78, a controller bottle 79, and a fluid reservoir 80 linked to a manifold interface 81. A variable displacement pump 82, and a subsea motor with a VFD 83 are also mounted on the BOP assembly 58.

The disclosed embodiments provide significant advantages with respect to BOP 58 applications. The battery 78 and pump 82 combination is very efficient. In essence, the battery 78 replaces the accumulators. The energy density of the batteries 78 is much higher than provided by accumulators (77 in FIG. 11). As further described below, embodiments of this disclosure provide greater controllability, they can maintain steady pressure, providing pressure on demand versus conventional pressure-drop accumulator systems. The disclosed systems provide precise pressure and flow control with variable displacement pumps and speed control. The use of dual actuators 30A, 30B and double stem ball valves in the controls 32 not only provides redundancy by allowing front side 24A or back side 24B panel 24 access and activation using the same valves, but it also eliminates pressure spikes in the system, which increases valve life and overall reliability. The disclosed systems also allow for easy access and component maintenance/replacement during service and troubleshooting.

Figure 13:
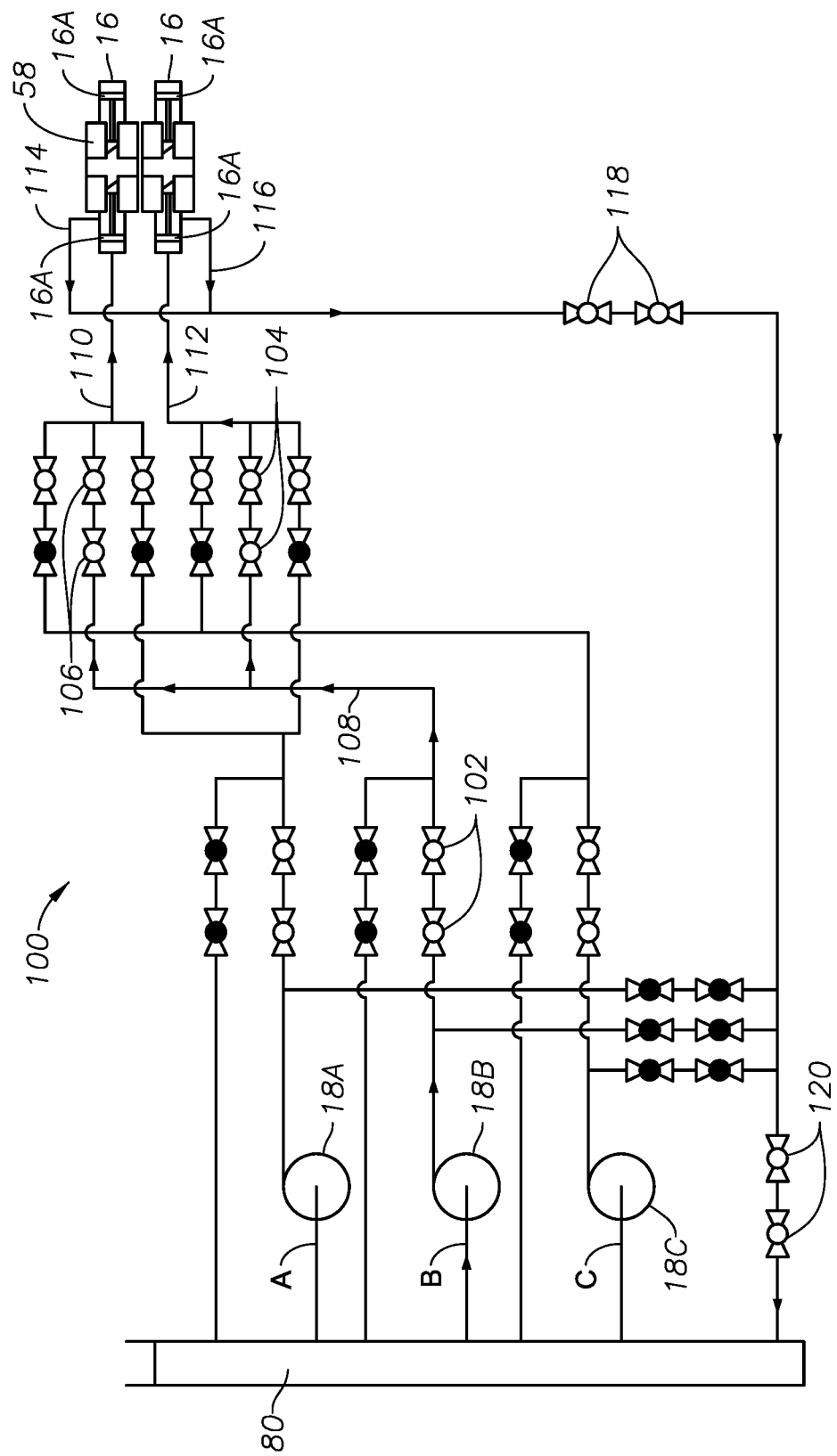
FIG. 13 shows a schematic of an example embodiment of a fluid control system according to this disclosure.

Turning to FIG. 13, various operational modes of the disclosed embodiments will now be described in more detail. FIG. 13 shows a schematic of an example embodiment of a fluid distribution system 100 implemented via the disclosed robotic system 20 embodiments (e.g., FIG. 10 embodiment). The system 100 is implemented using the plurality of valves (e.g., the double stem valves) in the controls 32 of a control panel 24. The valves are fluidly coupled on the control panel 24 into a series of fluid conduits or lines (e.g., conventional hoses, piping, etc.) to provide hydraulic fluid to operate a BOP assembly 58. A hydraulic fluid reservoir (e.g., FIG. 7, item 60; FIG. 10, item 75; FIG. 12, item 80) is fluidly coupled to provide hydraulic fluid to the system 100.

While known in the technical field of BOPs to provide two separate, independent hydraulic fluid channels to operate a BOP, embodiments of this disclosure are not limited to a specific number of hydraulic fluid channels. In some embodiments, multiple independent hydraulic fluid channels A, B, C may be used to activate the rams 16 in the BOP assembly 58. These multiple fluid channels are implemented via the valves 32 in the control panel(s) 24. Multiple hydraulic channels are preferably provided for backup redundancy in the event a hydraulic fluid channel fails to provide the hydraulic fluid to the BOP when activated. Each hydraulic fluid channel A, B, C respectively may comprise a separate hydraulic fluid pump 18A, 18B, 18C (e.g., FIG. 6, item 57; FIG. 10, item 74; FIG. 12, item 82) coupled into a respective conduit or line connecting the pump to the valves in the controls 32.

In the following description of the disclosed fluid distribution system 100 embodiments, the separately denoted valves will be understood to comprise the valves included in the controls 32 mounted on the control panel(s) 24. In some embodiments, the valves are shown as being two individual valves in series connection to open or close the respective hydraulic line. It will be appreciated that such series connection of two valves may be provided as a redundancy feature; opening or closing of the respective hydraulic line may be performed by a single valve, or by more such valves in series connection. Accordingly, the illustrated embodiments using two series connected valves are not a limitation on the scope of this disclosure.

In a BOP 58 ram 16 closing operation, one of the pumps 18A, 18B, 18C may be activated to provide the necessary hydraulic fluid pressure. By way of example, fluid flow using hydraulic fluid channel B will now be described with reference to FIG. 13. When pump 18B is activated, hydraulic fluid is moved from the reservoir 80 to flow through valves 102, 104, 106 and lines 108, 110, and 112 to one side of ram pistons 16A to close the rams 16. When the system 100 is operated to close the rams 16, hydraulic fluid on the opposite side of the ram pistons 16A will flow through lines 114, 116 and valves 118, 120 for return to the reservoir 80. A similar operation can be performed to actuate the ram(s) 16 using either of hydraulic fluid channels A or C by respectively activating the pump 18A or 18C and opening and closing the associated valves 32 in the selected hydraulic fluid channel. In all the figures of this disclosure, a darkened valve 32 represents the respective valve in the closed position. It will be appreciated that the described rams 16 are only one possible implementation according to this disclosure. Conventional single ram, dual ram, or spherical/annular BOPs 58 may be used to equal effect in various implementations of the disclosed embodiments.

Figure 14:
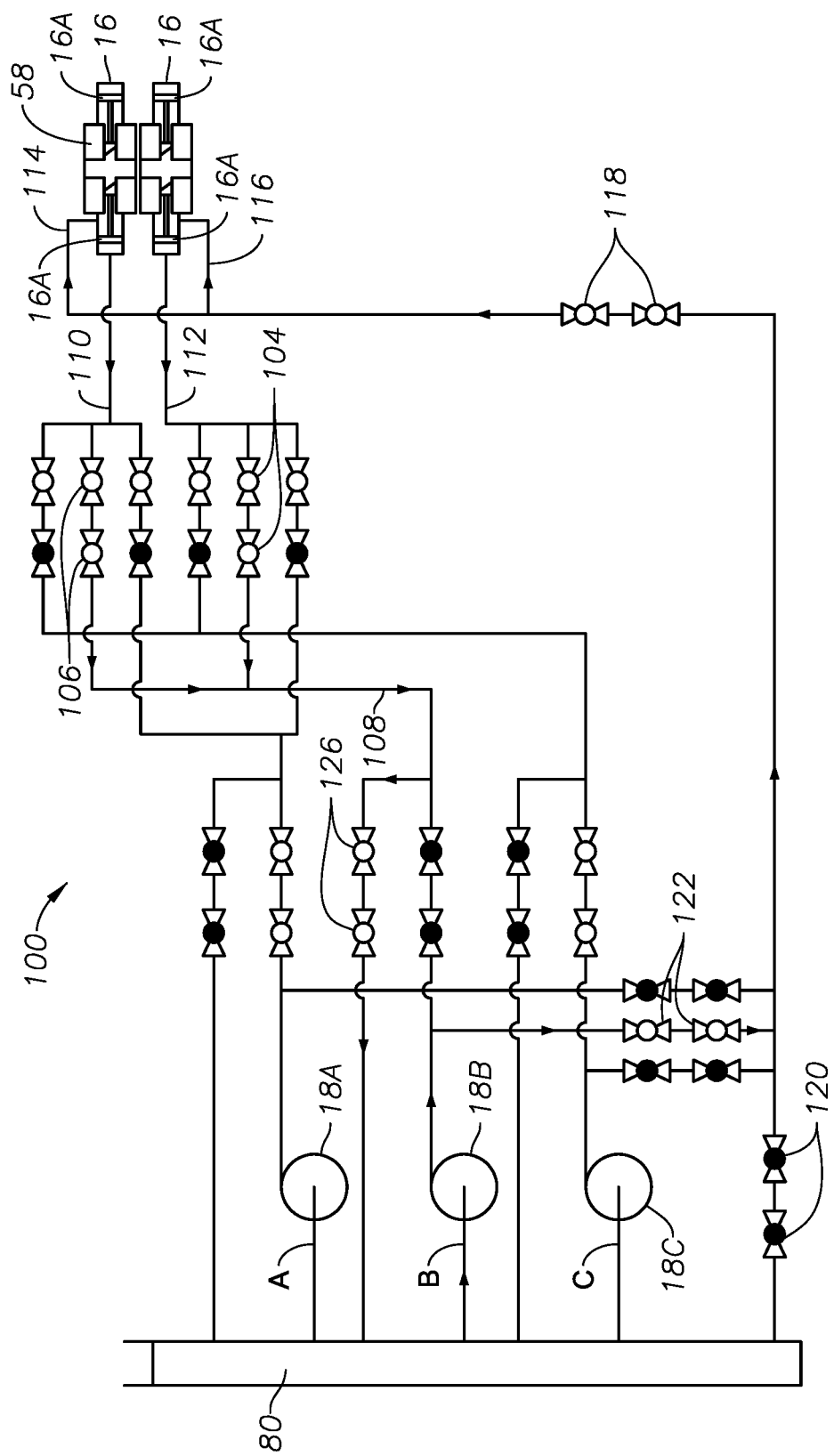
FIG. 14 shows a schematic of a ram opening operation according to this disclosure.

FIG. 14 shows a ram 16 opening operation in accordance with disclosed embodiments. For purposes of description, using hydraulic fluid channel B will continue to be described. The pump 18B is activated to move hydraulic fluid from the reservoir 80, through valves 122, 118 and lines 114 and 116 to the opposite (with reference to FIG. 13) side of the ram pistons 16A to open the BOP 58 rams 16. Hydraulic fluid on the one side (described with reference to FIG. 13) of the ram's pistons 16A will flow through lines 110, 112, 108 and valves 104, 106, and 126 for return to the reservoir 80. A similar operation can be performed to open the ram(s) 16 using either of channels A or C by respectively activating pump 18A or 18C and opening and closing the associated valves in the selected hydraulic fluid channel.

Figure 15:
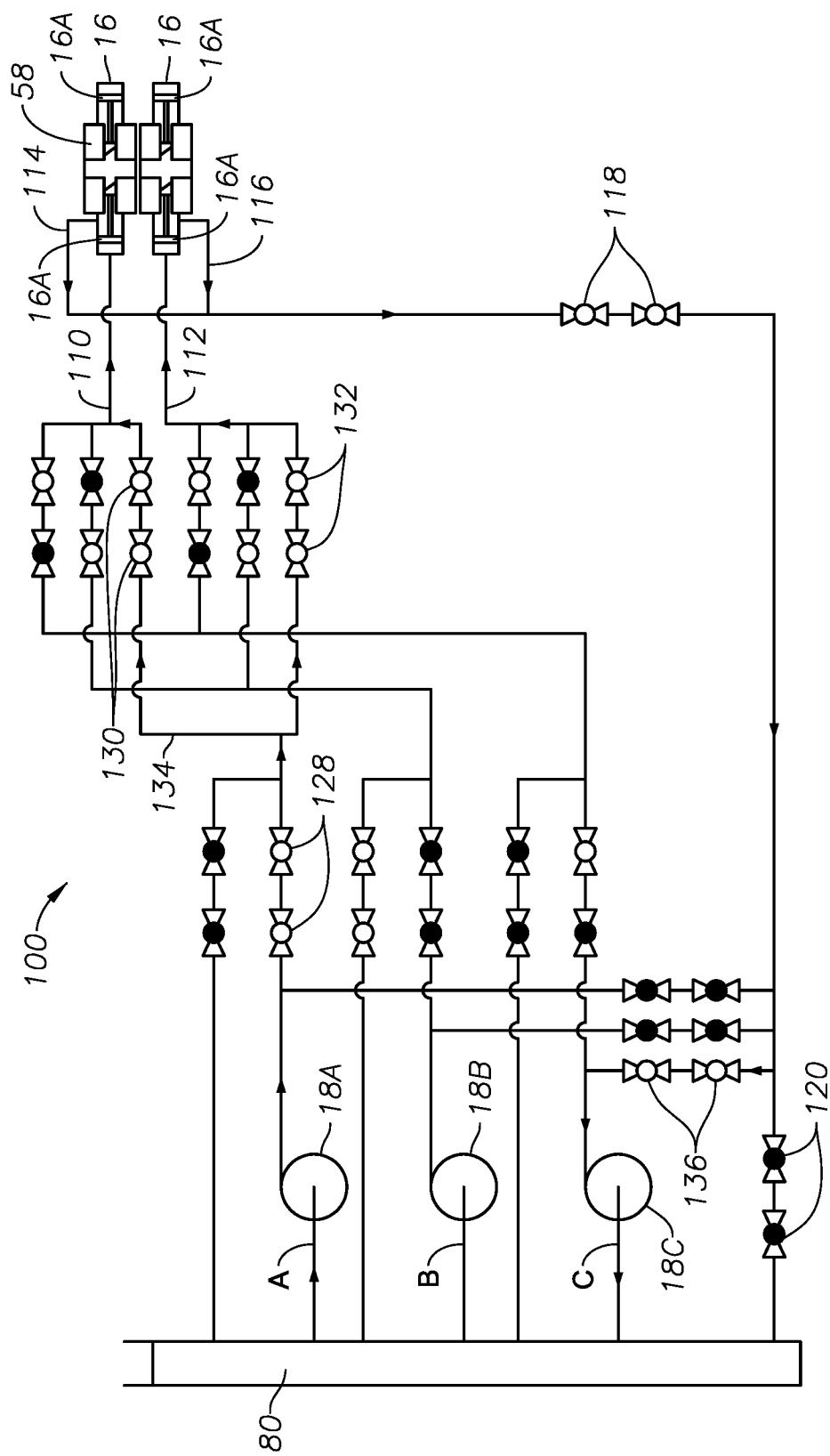
FIG. 15 shows a schematic of another example embodiment of a fluid control system according to this disclosure.

Having a plurality of pumps 18A, 18B, 18C in the system 100 enables using pressure differentials that can be attained by controlled operation of the pumps. FIG. 15 shows another embodiment according to this disclosure. In this embodiment, hydraulic fluid channel A may be used to close the rams 16. Pump 18A is activated to move hydraulic fluid from the reservoir 80 through valves 128, 130, 132 and lines 134, 110, and 112 to the one side of the ram pistons 16A to close the BOP 58 rams 16. Simultaneously, pump 18C may be activated to move hydraulic fluid from the opposite side of the ram pistons 16A through valves 118, 136 and lines 114 and 116 for return to the reservoir 80. Such dual pressurization (positive-negative) across the rams 16 provides a pressure assist, allowing for rapid and reliable closing of the rams 16. This pressure assist facilitates higher effective pressures across the ram piston 16A than may be possible by only using any of the pumps 18A, 18B, 18C to provide pressure to the one side of the ram pistons 16A. It will be appreciated that using certain ones of the valves 32 to selectively connect one or more of the pumps 18A, 18B, 18C to move fluid into or out of the rams 16 as explained above may be obtained equivalently by selectively operating one or more of the pumps 18A, 18B, 18C in reverse, such that the pressure differential across the ram(s) 16 is in the opposite direction, rapidly and reliable opening the rams.

Figure 16:
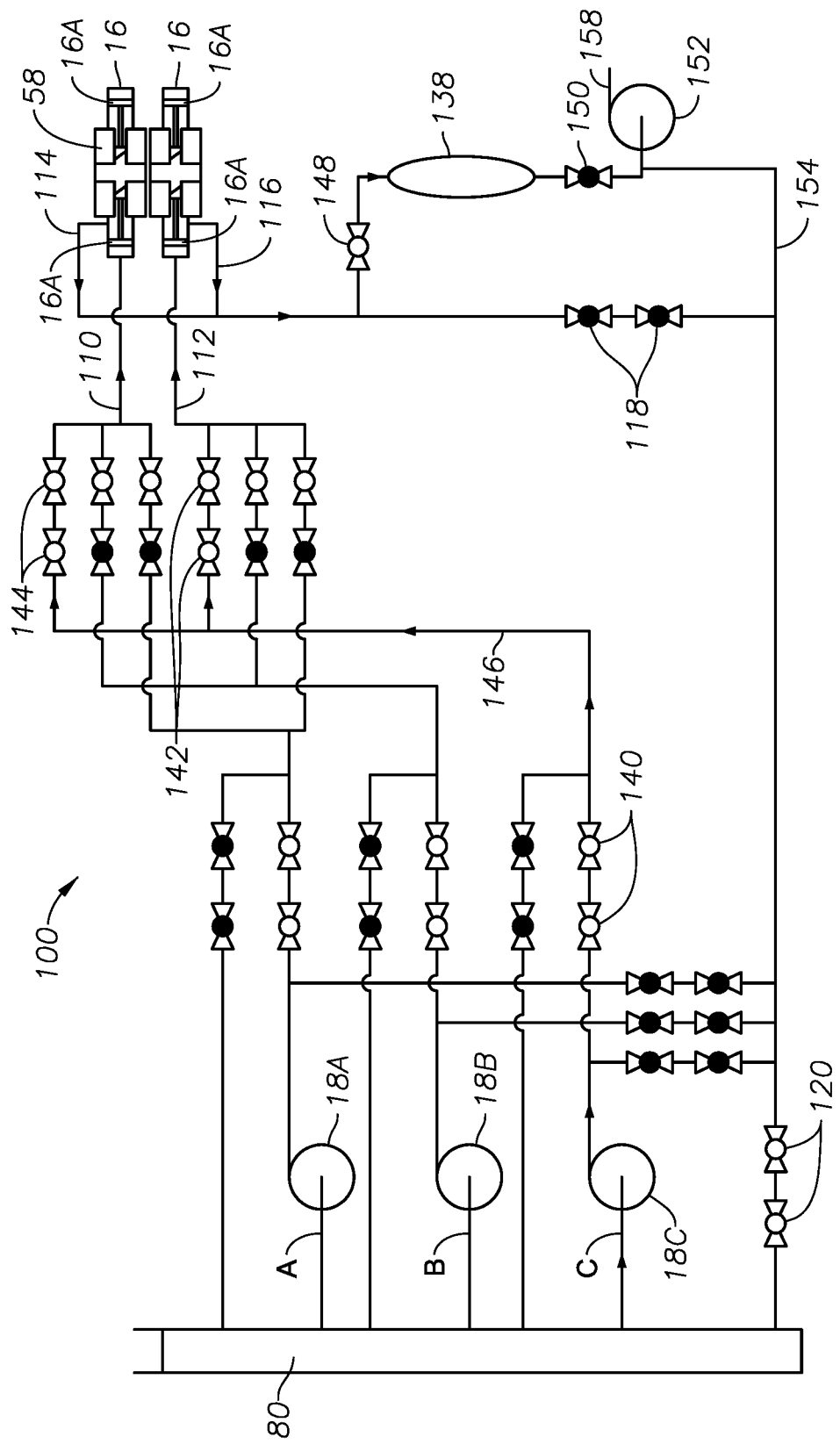
FIG. 16 shows a schematic of another example embodiment of a fluid control system according to this disclosure.

FIG. 16 shows another embodiment of this disclosure. In this embodiment, a sealed container, tank, chamber, or vessel 138 may be selectively fluidly connected into the system 100 to provide a vacuum or low-pressure reservoir. By fluidly connecting the vessel 138 into the line(s), a differential pressure assist can be obtained, similar in principle to the pressure differential provided by suitable connection and/or operation of the pumps 18A, 18B, 18C as explained with reference to the embodiment of FIG. 15. In one example implementation, pump 18C is activated to move hydraulic fluid from the reservoir 80 through valves 140, 142, 144 and lines 146, 110, and 112 to close the BOP 58 rams 16. Simultaneously, valve 148 may be opened and the vessel 138 thereby fluidly connected to the opposite side of the ram pistons 16A activated to allow the vacuum or low pressure in the vessel 138 to enable differential pressure assisted movement of hydraulic fluid from the opposite side of the ram pistons 16A into the vessel 138. This pressure assist facilitates higher effective operating pressures to operate the rams 16. Such operation may be advantageous for certain types of rams, e.g., shear rams. Once the vessel 138 is full of fluid, valve 148 can be closed, valve 150 opened, and a pump 152 fluidly connected to the vessel 138 can then be activated to evacuate the fluid and reinstate or re-charge the vacuum in the vessel 138. The evacuated fluid may be pumped into the reservoir 80 via line 154 and through valves 120 or to the environment via line 158. In this manner, a vacuum reservoir may be maintained in the vessel 138 for use in the system 100 as desired. While the embodiment of FIG. 16 is described in terms of vacuum being maintained in the vessel 138, in principle it is only necessary to maintain a lower pressure in the vessel 138 than the hydrostatic pressure of hydraulic fluid in the reservoir 80 to operate the system 100 as described. It will be appreciated that the effect obtained using the vessel 138 as described may be maximized by maintaining a vacuum in the vessel.

When systems according to this disclosure are disposed underwater (e.g., in subsea applications), the components are subjected to pressure conditions that may not be encountered by embodiments implemented in surface applications. In underwater applications, hydrostatic ambient pressure of the water in which the system is deployed becomes a consideration. For example, in a deepwater subsea application, seawater hydrostatic pressure may be 5000 Psi (34473 kPa) and the internal system 100 fluid pressure may be at 8000 Psi (55158 kPa). Short duration transients or surges can occur during which the system 100 pressure may rise much higher than the predetermined pressure that the valves or other components are able to withstand. As a result, valves, and other components in the system 100 can be subjected to fluid pressures that may cause deterioration and ultimate failure of the valves and other components. Valve internal elements comprising rubber or other non-metallic parts are particularly susceptible to deterioration when they are exposed to extreme fluid differential pressure transients during transitions from an open to closed state and vice-versa.

Figure 17:
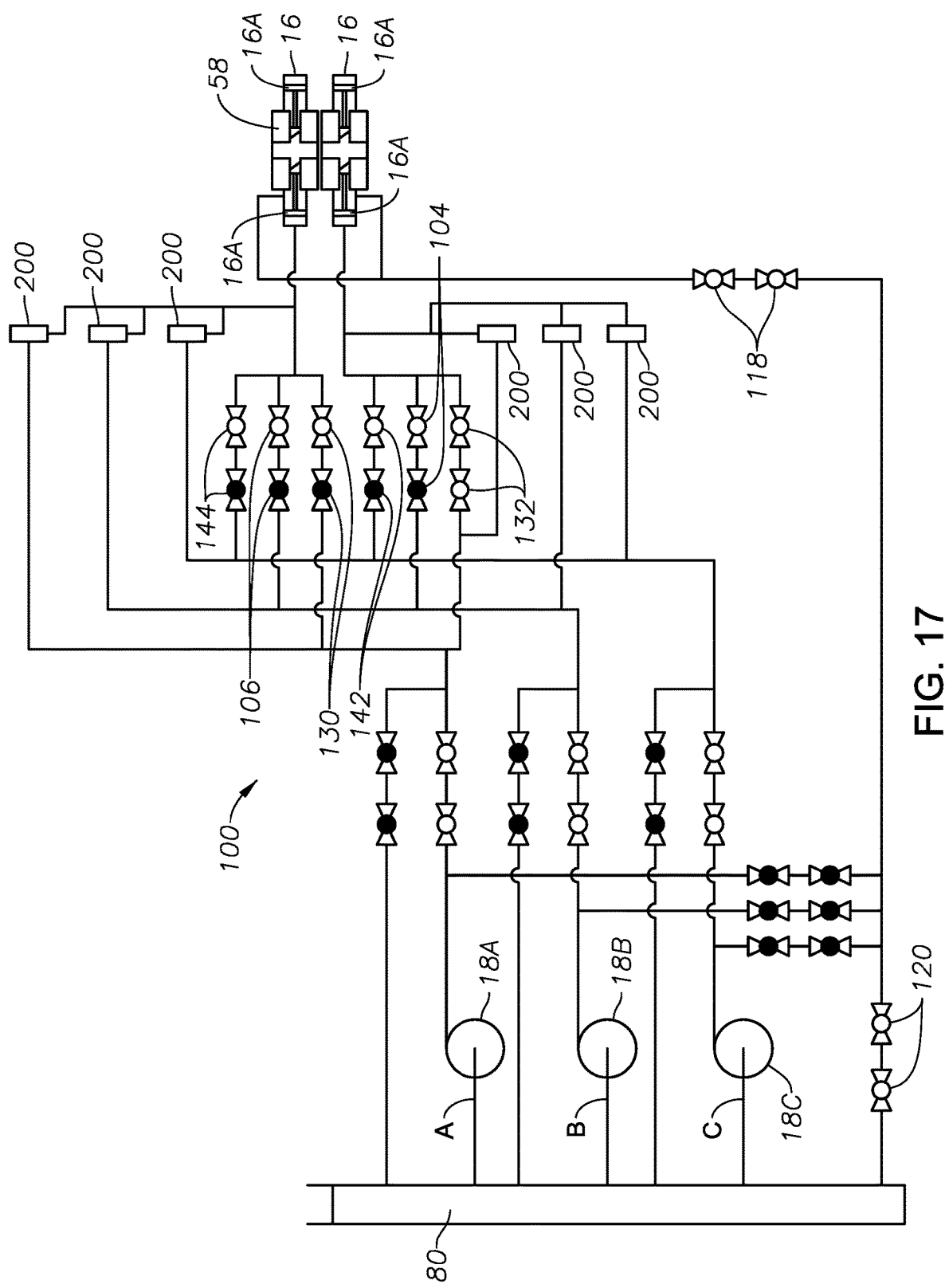
FIG. 17 shows a schematic of another example embodiment of a fluid control system according to this disclosure.

FIG. 17 shows another embodiment of this disclosure. In this embodiment, a pressure compensator 200 is connected into the hydraulic fluid lines associated with each ram 16 in the BOP 58. In this embodiment, the pressure compensators 200 may be, for example, piston-type pressure balancers, whereby a pressure change imparted to one side of a piston (not shown) within the compensator is transferred to the other side. In the embodiment shown in FIG. 17, any differential pressure transient induced on one side of, by opening or closing, any of valves 104, 106, 130, 132, 142, 144 may be transferred to the opposite side of the respective valve through the action of the respective pressure compensator 200. Although FIG. 17 shows such pressure compensators 200 used to protect the illustrated valves 104, 106, 130, 132, 142, 144, other embodiments may use pressure compensators to protect any other component of the system 100 from such pressure transients as may be desirable depending on the implementation.

It will be appreciated that the fluid reservoir 80 in the embodiments described with reference to FIGS. 13 through 17 may be pressure balanced when the system 100 is used in underwater applications. In such applications, water pressure acting on the system 100 will be related to the depth in the water at which the system 100 is deployed. To reduce the required pressure carrying capacity of the various components in the system 100, and to avoid the need to increase system operating pressure in respect of water pressure, in some embodiments the reservoir 80 may be pressure compensated, as will be further explained with reference to FIG. 18.

Figure 18:
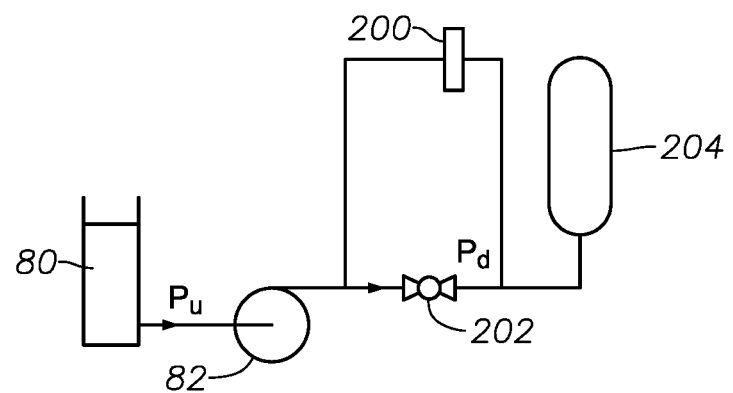
FIG. 18 shows a schematic of an example layout for implementation of a pressure compensator according to this disclosure.

FIG. 18 shows a schematic of an example general layout for implementation of a pressure compensator 200 with an embodiment according to this disclosure. The pressure compensator 200 is coupled into the fluid lines at both ends of a valve 202 (which may be, e.g., any of the valves in any of the disclosed embodiments). The valve 202 is shown coupled to a reservoir 80 on one end, coupled to a pump 82, designated as the upstream pressure end ($P_U$). In some underwater embodiments, the reservoir 80 may be pressurized to the hydrostatic seawater pressure $P_S$ (e.g., 5000 Psi (34473 kPa) in a deepwater application), using a pressure balancer, e.g., a piston, movable barrier or membrane as known in the art to transfer hydrostatic pressure outside the reservoir 80 to the fluid in the reservoir. On the other end of the valve 202, designated as the downstream pressure ($P_D$) end, an end consumer 204, that is, a device operable by fluid pressure (e.g., a BOP 58 or other tool/unit) is coupled into the system. When the valve 202 is in the open position, there is no differential pressure across the valve. However, if the system pressure is increased by the pump 82, with the valve 202 closed and the upstream pressure $P_U$ subsequently reduced back to seawater pressure, there would be a significant pressure differential across the valve 202. The pressure compensator 200 allows this pressure differential to be maintained until the system or operator decides to activate the valve 202 and balance the upstream $P_U$ and downstream $P_D$ pressures. Expressed more generally, the pressure compensator 200 may be connected across any device subject to pressure transients to communicate the transient from one side of the device to the other, and to dampen such pressure transients. Communicating the transients reduces the pressure differential across the connected device and dampening the transients may reduce any momentary pressure differential resulting from pressure communication time of the compensator 200.

In such embodiments as explained with reference to FIG. 18, the fluid pressure in the reservoir 80 may be maintained at the same pressure as the hydrostatic pressure of the water. Operating pressure to actuate the pressure operated device 204 may be provided by the pump 82, which charges the fluid to a selected pressure above the hydrostatic pressure. In the embodiments explained with reference to FIGS. 13 through 17, a pump (e.g., 18A, 18B, 18C), or as in FIG. 16, the vessel 138, may be used to assist movement of fluid from the pressure operated device 204 (e.g., rams 16) back to the reservoir 80. In such embodiments the pressure of the fluid is reduced below hydrostatic pressure by the action of the pump (e.g., 18A, 18B, 18C) or the vessel 138.

Figure 19:
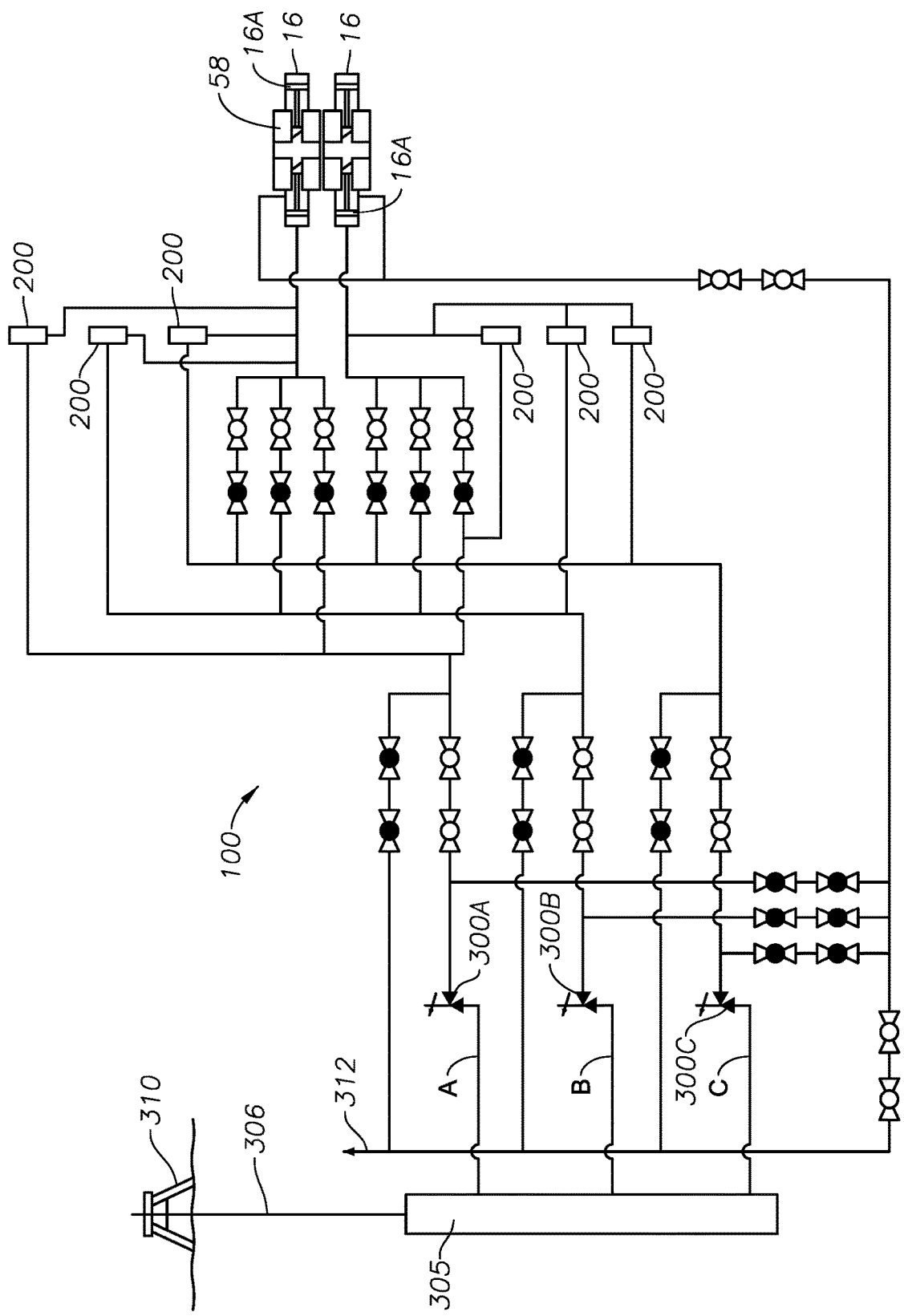
FIG. 19 shows a schematic of another example embodiment of a fluid control system according to this disclosure.

FIG. 19 shows another embodiment of this disclosure. In this embodiment, adjustable choke valves 300A, 300B, 300C may be used instead of pumps. The fluid channels A, B, C are coupled to a fluid conduit 305. In underwater implementations, hydraulic fluid may be provided to the conduit 305 under pressure along a fluid line 306 from a floating platform 310. The conduit 305 may be considered equivalent (in terms of providing a fluid receptacle) to the fluid reservoir 80 described with respect to other embodiments disclosed herein. In some embodiments, hydraulic fluid may be supplied to the system 100 under pressure via separate feed lines linked to fluid channels A, B, C (not shown). In some embodiments, a fluid vent 312 (using conventional valving) may be included to provide a system 100 outlet as known in the art. Embodiments may be configured with any of the features and components disclosed herein.

Figure 20:
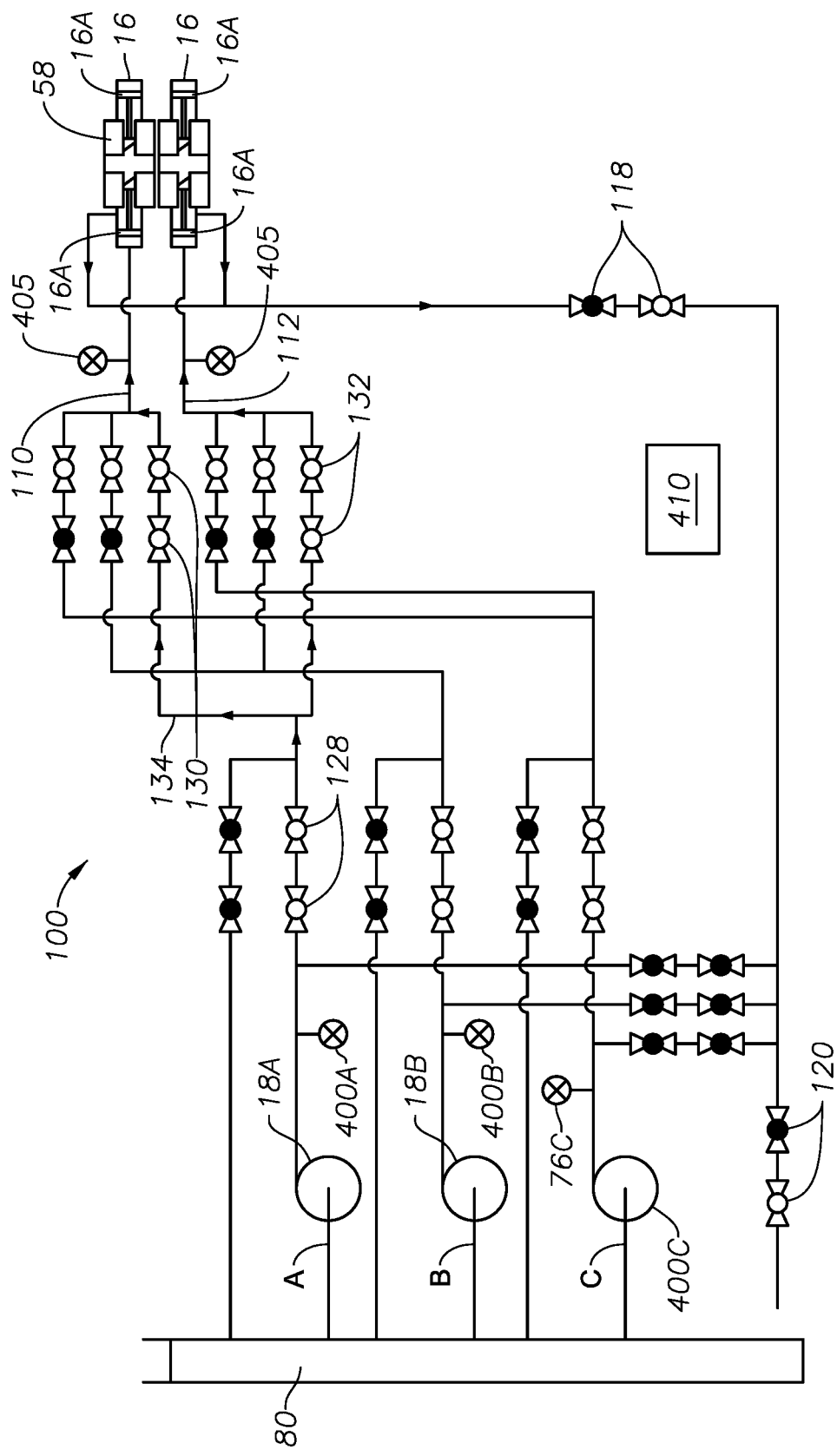
FIG. 20 shows a schematic of another example embodiment of a fluid control system according to this disclosure.

FIG. 20 shows another embodiment of this disclosure. In this embodiment, pressure gauges 400A, 400B, 400C are respectively disposed in the fluid lines in between the pumps 18A, 18B, 18C and the valves coupled into the lines linking to the BOP 58. Pressure gauges 405 are also disposed in the fluid lines 110, 112 coupled to the BOP 58. Conventional pressure gauges/transducers designed for underwater use may be used in implementations of the disclosed embodiments. In some embodiments, conventional pressure gauges 400A, 400B, 400C, 405 configured for wireless data/signal transmission may be used if desired. A control unit 410 (e.g., FIG. 7, item 46; FIG. 10, item 76; FIG. 12, item 79) is linked into the system 100 to receive data input from the pressure gauges 400A, 400B, 400C, 405, to activate the pumps 18A, 18B, 18C, and open/close the valves in the system to provide fluid pressure control along selected fluid circuits in the system 100. For example, fluid flow using hydraulic fluid channel A will now be described.

Hydraulic fluid channel A may be used to close the rams 16. Pump 18A may be activated to move hydraulic fluid from the reservoir 80 through valves 128, 130, 132 and lines 134, 110, and 112 to one side of the ram pistons 16A to close the BOP 58 rams 16. Upon closure of the rams 16, control unit 410 may be configured to close valves 118 and 128, 130, and/or 132, and to deactivate pump 18A. In this manner, the fluid channel or circuit comprising the lines between valves 118 and 128 can remain pressurized even though the pump 18A is deactivated. Then, when it is desired to open any of the valves in the circuit, pump 18A may be activated to pressurize the line until the fluid pressure reading on gauge 400A matches the reading on gauge(s) 405, thereby indicating a balanced pressure across the valves, whereupon the control unit 410 can selectively open the respective valve(s) without a pressure differential during the transition phase. In a similar manner, the control unit 410 may be configured to selectively activate/deactivate pumps 18B and/or 18C and open/close any of the valves in the system to pressurize selected fluid circuits and maintain balanced fluid pressure across components in the system during fluid flow transition phases. In some embodiments, the control unit 410 may be remotely linked into the system 100 as known in the art. It will also be appreciated that the control unit 410 may comprise any suitable microcomputer, microprocessor or any similar device and may be programmed to activate and run the components on the system 100 as described herein. In some embodiments of this disclosure, the control units can be programmed to perform autonomous activations of the pumps and valves as described herein.

In light of the principles and example embodiments described and illustrated herein, it will be recognized that the example embodiments can be modified in arrangement and detail without departing from such principles. It will be appreciated by those skilled in the art that conventional hardware, electronics, software, controllers, components, as well as conventional frame structures, tubing, and housings using suitable materials, may be used to implement the embodiments according to this disclosure. It will also be appreciated that the valves, controls, and components of embodiments if this disclosure may be remotely operated (e.g., via remotely operated vehicles, linked signal/communication channels, etc.).

It will also be appreciated that embodiments of this disclosure may be implemented for use in numerous subsea applications and operations, in the oil and gas industry and in other fields of endeavor. For purposes of defining the scope of this disclosure, any embodiment referenced herein is freely combinable with any one or more of the other embodiments referenced herein, and any number of features of different embodiments are combinable with one another, unless expressly stated otherwise. It will also be appreciated that embodiments may be implemented using conventional processors and memory in applied computing systems.

What is claimed is:

1. A robotic system for fluid distribution, comprising:
   a frame;
   a control panel disposed proximate the frame and having a plurality of controls thereon;
   a first actuator disposed on the frame to selectively actuate a control of the plurality of controls on the control panel from a front side of the panel;
   a second actuator disposed on the frame to selectively actuate a control of the plurality of controls on the control panel from a back side of the panel;
   wherein one or more controls of the plurality of controls is configured to regulate distribution of a fluid.

2. The robotic system of claim 1 further comprising a battery disposed proximate the frame and configured to power at least one component on the frame.

3. The robotic system of claim 2 further comprising an electrical power line extending from the battery to a source of electric power remote from the battery to charge the battery.

4. The robotic system of claim 1 wherein the frame is configured to couple to a blowout preventer.

5. The robotic system of claim 4 further comprising at least one hydraulic pump disposed proximate the frame and configured to flow fluid through at least one control of the plurality of controls on the control panel.

6. The robotic system of claim 5 wherein the fluid flow through at least one control of the plurality of controls is further configured to flow the fluid into or out of a ram actuator on the blowout preventer.

7. The robotic system of claim 5 further comprising at least one battery configured to power the at least one hydraulic pump.

8. The robotic system of claim 4 further comprising at least one vessel selectively fluid connected to a rain actuator on the blowout preventer for moving fluid out of the ram actuator.

9. The robotic system of claim 1 further comprising means for establishing a balanced fluid pressure condition across components in the system.

10. The robotic system of claim 1 wherein one or more controls of the plurality of controls comprises at least one valve.

11. The robotic system of claim 10 wherein the at least one valve is configured for selective activation to sustain a fluid pressure within the system.

12. The robotic system of claim 10 wherein the at least one valve is configured to control pressure in a vessel.

13. The robotic system of claim 1 further comprising a controller in signal communication with the first actuator and/or the second actuator to position the respective actuator proximate a selected one of the plurality of controls on the control panel.

14. The robotic system of claim 13 further comprising a communication channel in communication with the controller to enable remote signal communication with the robotic system.

15. The robotic system of claim 1 further comprising a reservoir to provide a fluid supply for distribution of the fluid via one or more controls of the plurality of controls on the control panel.

16. The robotic system of claim 1 further comprising one or more additional frames, wherein each additional frame comprises:
    a control panel having a plurality of controls;
    a first actuator disposed on the frame to selectively actuate a control of the plurality of controls on the control panel from a front side of the panel; and
    a second actuator disposed on the frame to selectively actuate a control of the plurality of controls on the control panel from a back side of the panel.

17. The robotic system of claim 1 wherein the control panel is configured with a receptacle to engage a remotely operated vehicle.

18. The robotic system of claim 1 wherein the first actuator and the second actuator are configured to actuate the same control of the plurality of controls on the control panel.

19. The robotic system of claim 1 wherein the frame is configured for disposal in a body of water.

20. The robotic system of claim 1 further comprising at least one hydraulic pump configured to affect fluid pressure in the system.

21. The robotic system of claim 1 wherein the control panel comprises a plurality of valves configured to establish a fluid pressure condition that facilitates closing and/or opening of one or more of the valves.

22. The robotic system of claim 21 wherein at least one valve of the plurality of valves is configured to control pressure in a vessel.

23. A robotic system for fluid distribution, comprising:
a frame coupled to a blowout preventer;
a control panel disposed proximate the frame and having a plurality of controls thereon;
a first actuator disposed on the frame to selectively actuate a control of the plurality of controls on the control panel from a front side of the panel;
a second actuator disposed on the frame to selectively actuate a control of the plurality of controls on the control panel from a back side of the panel;
a fluid reservoir;
wherein one or more controls of the plurality of controls is configured to regulate distribution of fluid in the system;
means for moving fluid from the fluid reservoir into an actuator on the blowout preventer.

24. The robotic system of claim 23 wherein the frame is configured for disposal in a body of water.

25. A method for robotic fluid distribution, comprising:
disposing a frame at a selected location, the frame having a control panel with a plurality of controls thereon; and
regulating distribution of a fluid by:
activating a first actuator disposed on the frame to selectively actuate a control of the plurality of controls on the control panel from a front side of the panel, and
activating a second actuator disposed on the frame to selectively actuate a control of the plurality of controls on the control panel from a back side of the panel.

26. The method of claim 25 further comprising providing at least one hydraulic pump to flow fluid through at least one control of the plurality of controls on the control panel.

27. The method of claim 26 wherein power for activating the first actuator, the second actuator, and/or the at least one hydraulic pump is provided by a battery.

28. The method of claim 27 wherein the battery is charged by a source of electrical power remote from the battery.

29. The method of claim 25 wherein the frame is coupled to a blowout preventer.

30. The method of claim 29 comprising using at least one hydraulic pump to move fluid into or out of an actuator on the blowout preventer.

31. The method of claim 29 comprising moving fluid into an actuator on the blowout preventer while simultaneously moving fluid out of an actuator on the blowout preventer.

32. The method of claim 25 comprising establishing a balanced fluid pressure condition across components fluidly linked to the control panel.

33. The method of claim 32 wherein establishing a balanced fluid pressure condition comprises selective actuation of one or more valves on the control panel.

34. The method of claim 25 wherein the regulating distribution of a fluid is performed autonomously via a controller linked to the control panel.

35. The method of claim 25 wherein the first actuator and the second actuator are configured to actuate the same control of the plurality of controls on the control panel.

36. The method of claim 25 wherein disposing the frame at a selected location comprises disposing the frame in a body of water.

37. The method of claim 25 further comprising providing at least one hydraulic pump to affect fluid pressure.

38. The method of claim 25 wherein the control panel comprises a plurality of valves configured to establish a fluid pressure condition that facilitates closing and/or opening of one or more of the valves.

39. The method of claim 38 wherein at least one valve of the plurality of valves is configured to control pressure in a vessel.

* * * * *